(12) United States Patent
Nakagawa et al.

(10) Patent No.: US 11,584,669 B2
(45) Date of Patent: Feb. 21, 2023

(54) GAS-DISSOLVED LIQUID MANUFACTURING DEVICE

(71) Applicant: EBARA CORPORATION, Tokyo (JP)

(72) Inventors: Yoichi Nakagawa, Tokyo (JP); Suguru Ozawa, Tokyo (JP); Yuji Araki, Tokyo (JP); Toshifumi Watanabe, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 16/922,415

(22) Filed: Jul. 7, 2020

(65) Prior Publication Data

US 2021/0017056 A1    Jan. 21, 2021

(30) Foreign Application Priority Data

Jul. 19, 2019  (JP) .............................. JP2019-133217

(51) Int. Cl.

| | | |
|---|---|---|
| *C02F 1/78* | (2006.01) |
| *C02F 1/20* | (2023.01) |
| *B01D 19/00* | (2006.01) |
| *C02F 1/00* | (2023.01) |
| *B01F 23/231* | (2022.01) |
| *C02F 103/04* | (2006.01) |
| *B01F 23/237* | (2022.01) |
| *B01F 101/48* | (2022.01) |

(52) U.S. Cl.
CPC ............ *C02F 1/78* (2013.01); *B01D 19/0042* (2013.01); *B01F 23/23121* (2022.01); *C02F 1/008* (2013.01); *C02F 1/20* (2013.01); *B01F 23/237613* (2022.01); *B01F 2101/48* (2022.01); *C02F 2103/04* (2013.01); *C02F 2209/42* (2013.01)

(58) Field of Classification Search
None
See application file for complete search history.

(56) References Cited

U.S. PATENT DOCUMENTS

| | | | | |
|---|---|---|---|---|
| 4,952,509 A | * | 8/1990 | Wegner ............... | B01D 19/0047 435/301.1 |
| 5,122,312 A | * | 6/1992 | Tomalesky .......... | B01F 3/04262 209/170 |
| 2005/0279713 A1 | * | 12/2005 | Osborn ................. | B01F 5/0498 210/760 |
| 2008/0197516 A1 | * | 8/2008 | Abe ...................... | B01F 5/0646 261/75 |
| 2014/0251140 A1 | * | 9/2014 | Sams ..................... | B04C 5/04 95/261 |
| 2017/0282132 A1 | | 10/2017 | Ozawa et al. | |

(Continued)

FOREIGN PATENT DOCUMENTS

| | | |
|---|---|---|
| JP | H10-202247 A | 8/1998 |
| JP | 2007-075749 A | 3/2007 |

(Continued)

*Primary Examiner* — Richard C Gurtowski
(74) *Attorney, Agent, or Firm* — Pearne & Gordon LLP

(57) ABSTRACT

A gas dissolved liquid manufacturing device includes: a pump configured to pressurize a liquid; a pipe communicating with the pump; a nozzle disposed in the pipe, the nozzle being configured to generate micro bubbles using a supplied gas; and a gas-liquid separation tank whose upper part communicates with the pipe, the gas-liquid separation tank being configured to separate a gas-liquid mixture generated by the nozzle into a gas and a liquid.

11 Claims, 22 Drawing Sheets

(56) References Cited

U.S. PATENT DOCUMENTS

2018/0333686 A1 11/2018 Nakagawa
2019/0193034 A1 6/2019 Nakagawa et al.

FOREIGN PATENT DOCUMENTS

| JP | 2009-507618 A | 2/2009 |
| JP | 2013-017944 A | 1/2013 |
| JP | 2016-064386 A | 4/2016 |
| JP | 2018-192439 A | 12/2018 |
| JP | 2019-072707 A | 5/2019 |
| JP | 2019-111495 A | 7/2019 |
| WO | 2006/075452 A1 | 7/2006 |

* cited by examiner

GAS-DISSOLVED LIQUID MANUFACTURING DEVICE

CROSS-REFERENCE TO RELATED APPLICATION

This application claims the benefit of Japanese Priority Patent Application JP 2019-133217 filed on Jul. 19, 2019, the entire contents of which are incorporated herein by reference.

FIELD

The present technology relates to a gas-dissolved liquid manufacturing device.

TECHNOLOGY AND SUMMARY

In recent years, cleaning of products in a semiconductor device factory or a factory for manufacturing electronic components such as liquid crystals has become more sophisticated with the complexity of manufacturing processes and miniaturization of circuit patterns. For example, fine particles, metals, organic substances, etc. attached to the silicon wafer are removed using a special liquid (called a cleaning liquid) obtained by dissolving high-purity gas or high-purity gas and chemicals in functional water (such as ultrapure water).

As the cleaning method includes, in addition to the "batch processing method", in which a plurality of silicon wafers is repeatedly immersed and cleaned at the same time, the "single wafer processing method", in which chemical cleaning and ultrapure water cleaning are performed for each single wafer for products of various types and small-lot production. Since the single-wafer processing method requires a long cleaning process time per wafer (tact time) and a large amount of cleaning liquid used, compared to batch processing method, there is a demand for a reduction in tact time and a reduction in the amount of cleaning liquid used. At present, in order to reduce the amount of cleaning liquid used and achieve effective cleaning in a short time, an advanced cleaning process in which the cleaning process is switched in a short time is performed using a plurality of functional waters and chemicals alone or simultaneously.

As the functional water, for example, ozone water obtained by dissolving ozone gas in ultrapure water is used. Ozone dissolved in ultrapure water has very strong oxidizing power even at a low concentration (several ppms), so that organic substances and metals can be removed. This ozone water is generally produced by an ozone water manufacturing device. In JP 2018-192439 A, ozone water obtained by dissolving ozone gas in ultrapure water is supplied to the gas-liquid separation tank, and ozone water and excess gas are discharged from the gas-liquid separation tank.

In the related art, a mixture of liquid and gas has been introduced into a gas-liquid separation tank from vertically downward to upward. The gas flows upward in the liquid staying inside the gas-liquid separation section, and the liquid subjected to the gas-liquid separation goes downward to perform smooth gas-liquid separation.

However, because the gas-liquid separation is so smooth, the long contact time between gas and liquid cannot be ensured, so that gas dissolution efficiency cannot be raised to the target (for example, the maximum).

It is desired to provide a gas dissolved liquid manufacturing device that can improve the gas solubility.

A gas dissolved liquid manufacturing device according to one embodiment comprises: a pump configured to pressurize a liquid; a pipe communicating with the pump; a nozzle disposed in the pipe, the nozzle being configured to generate micro bubbles using a supplied gas; and a gas-liquid separation tank whose upper part communicates with the pipe, the gas-liquid separation tank being configured to separate a gas-liquid mixture generated by the nozzle into a gas and a liquid.

DETAILED DESCRIPTION

Figure 1:
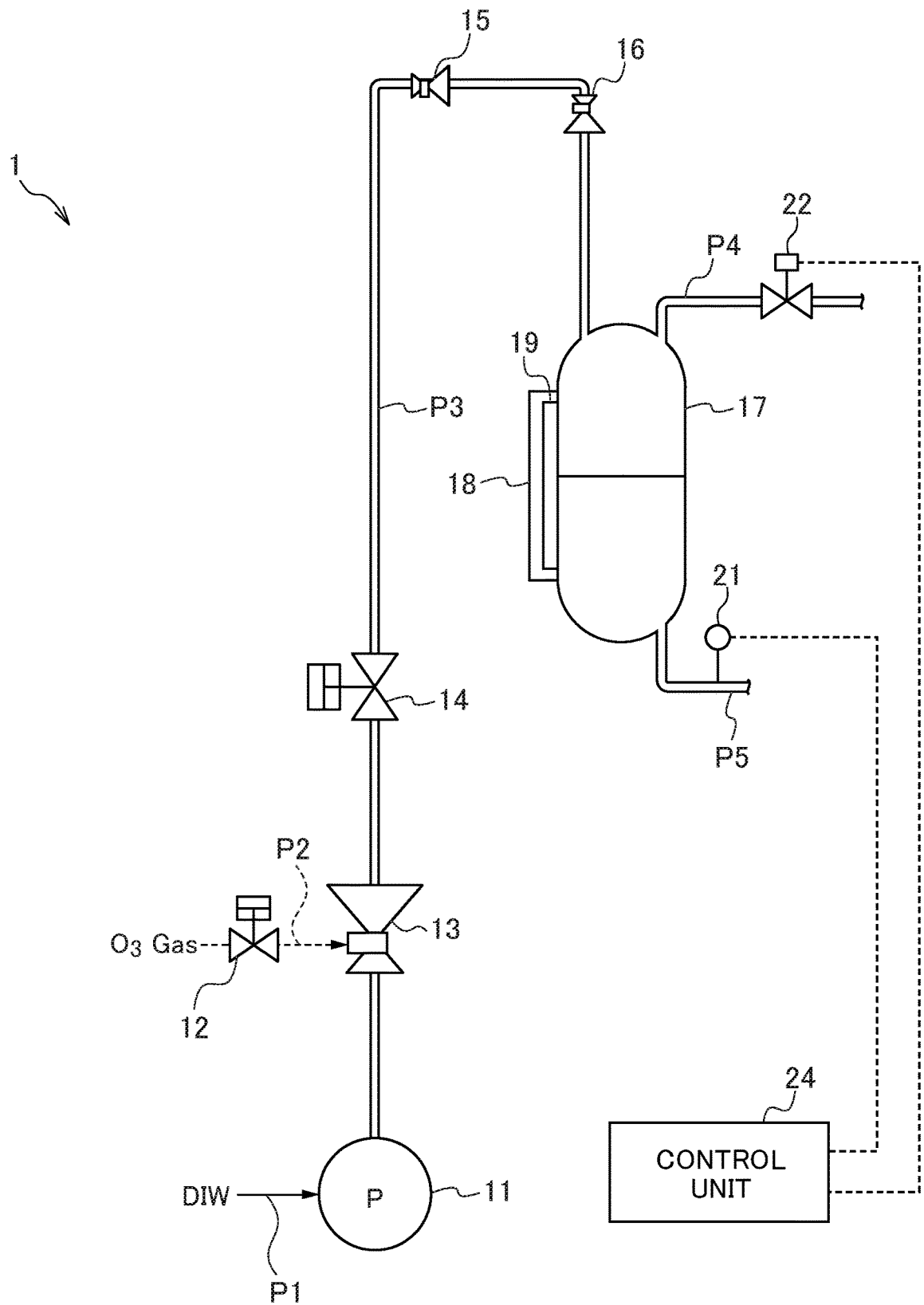
FIG. 1 is a schematic diagram of a gas dissolved liquid manufacturing device according to a first embodiment.

Hereinafter, each embodiment will be described with reference to the drawings. However, detailed explanation more than necessary may be omitted. For example, detailed explanations of already well-known matters and redundant explanation on substantially the same configuration may be omitted. This is to avoid the unnecessary redundancy of the following description and to facilitate understanding by those skilled in the art.

A gas dissolved liquid manufacturing device according to a first aspect of one embodiment comprises: a pump configured to pressurize a liquid; a pipe communicating with the pump; a nozzle disposed in the pipe, the nozzle being configured to generate micro bubbles using a supplied gas; and a gas-liquid separation tank whose upper part communicates with the pipe, the gas-liquid separation tank being configured to separate a gas-liquid mixture generated by the nozzle into a gas and a liquid.

According to this configuration, the gas-liquid mixture flows in from the upper part of the gas-liquid separation tank, so that the gas going upwards and the liquid going downward oppose each other to form a complex flow inside the gas-liquid separation tank. Therefore, the gas-liquid contact time can be kept longer than that in the comparative example, and the gas dissolution efficiency can be improved. As a result, a gas dissolved liquid having a higher concentration can be obtained.

The gas dissolved liquid manufacturing device according to a second aspect of one embodiment is a gas dissolved liquid manufacturing device according to the first aspect, wherein $0<d/D\leq 0.5$ and $0<f/F\leq 5$, where D is an internal diameter of the gas-liquid separation tank, d is an internal diameter of the pipe, F is a flow rate of a liquid of a gas-liquid mixture supplied to the gas-liquid separation tank from above by the pipe, and f is a flow rate of a gas contained in the gas-liquid mixture.

According to this configuration, in the vicinity of the water surface inside the gas-liquid separation tank, a complicated flow of bubbles and liquid is formed, and the frequency of gas-liquid contact increases, so that gas solubility can be improved.

The gas dissolved liquid manufacturing device according to a third aspect of one embodiment is a gas dissolved liquid manufacturing device according to the first or second aspect, wherein the gas-liquid separation tank has a sectional area of a space through which a liquid is capable of passing, the sectional area decreasing as going downward, and the gas dissolved liquid manufacturing device comprises: a flow rate sensor configured to detect a flow rate of a liquid supplied to the gas-liquid separation tank; and a control unit configured to control the pump so that the lower the flow rate measured by the flow rate sensor, the lower a liquid level is kept.

According to this configuration, even when the flow rate flowing into the gas-liquid separation tank fluctuates, the complex flow formed by a gas and a liquid does not leave the inner wall of the gas-liquid separation tank, so that stable gas-liquid contact using the inner wall can be achieved, and gas solubility can be improved.

The gas dissolved liquid manufacturing device according to a fourth aspect of one embodiment is a gas dissolved liquid manufacturing device according to the third aspect, wherein a flow path adjustment member configured to form a discharge port through which a gas-liquid mixture is discharged and a flow path to the discharge port is provided inside the gas-liquid separation tank, and a sectional area of the flow path is smaller than a sectional area of the gas-liquid separation tank, or the sectional area of the flow path decreases as going downward, and the control unit controls the pump so as to keep a liquid level at a position above the flow path adjustment member when a flow rate measured by the flow rate sensor exceeds a threshold, and controls the pump so as to keep a liquid level in the flow path formed by the flow path adjustment member when the flow rate measured by the flow rate sensor is equal to or less than the threshold.

According to this configuration, a large amount of gas moves and a large amount of liquid moves when the flow rate exceeds the threshold, so that the complicated flow region formed by the gas and the liquid can reach the inner wall of the gas-liquid separation tank. As a result, stable gas-liquid contact using the inner wall of the gas-liquid separation tank can be achieved, and the gas solubility can be improved. On the other hand, a small amount of gas moves and a small amount of liquid moves when the flow rate is equal to or less than the threshold. For this reason, even when the complicated flow region formed by gas and liquid is small, the liquid level is kept in the flow path formed by the flow path adjustment member, so that the complicated flow region can reach the inner wall of the flow path adjustment member. As a result, stable gas-liquid contact using the inner wall of the flow path adjustment member can be achieved, and the gas solubility can be improved.

The gas dissolved liquid manufacturing device according to a fifth aspect of one embodiment is a gas dissolved liquid manufacturing device according to the fourth aspect, wherein a step is provided on an inner wall of the flow path adjustment member.

According to this configuration, the sectional area through which the liquid can pass from the upper side to the lower side can be reduced by one step, so that the complicated flow region formed by the gas and the liquid can be kept in a space above the step.

The gas dissolved liquid manufacturing device according to a sixth aspect of one embodiment is a gas dissolved liquid manufacturing device according to the third aspect, wherein a protrusion or a structure with irregularity is provided on an inner wall of the flow path adjustment member.

According to this configuration, when the liquid collides with the protrusion or the structure, a stirring effect is generated, and the dissolution of the gas is promoted.

The gas dissolved liquid manufacturing device according to a seventh aspect of one embodiment is a gas dissolved liquid manufacturing device according to the first aspect, wherein a protrusion or a structure with irregularity is provided on an inner wall of the gas-liquid separation tank.

According to this configuration, when the liquid collides with the protrusion or the structure, a stirring effect is generated, and the dissolution of the gas is promoted.

The gas dissolved liquid manufacturing device according to an eighth aspect of one embodiment is a gas dissolved liquid manufacturing device according to the seventh aspect, wherein a cross section of the gas-liquid separation tank is substantially circular, and wherein the pipe is connected to the gas-liquid separation tank such that the pipe is located in a tangential direction of a circle that is an outer edge of the gas-liquid separation tank in plan view so that the gas-liquid mixture flowing into the gas-liquid separation tank moves along the inner wall of the gas-liquid separation tank.

According to this configuration, the gas-liquid mixture flowing in from the pipe moves along the inner wall of the gas-liquid separation tank. As a result, the gas-liquid mixture collides with the protrusion provided on the inner wall of the gas-liquid separation tank, a stirring effect is generated at the time of this collision, and the dissolution of the gas is promoted.

The gas dissolved liquid manufacturing device according to a ninth aspect of one embodiment is a gas dissolved liquid manufacturing device according to any one of the first to eighth aspect, wherein a supply port communicating with the pipe is provided at an upper part of the gas-liquid separation tank, a shower nozzle communicating with the supply port is provided inside the gas-liquid separation tank, and the shower nozzle sprays a supplied gas-liquid mixture and discharges the sprayed gas-liquid mixture into the gas-liquid separation tank.

According to this configuration, the gas-liquid contact area can be increased, and the dissolution of the gas is promoted.

The gas dissolved liquid manufacturing device according to a tenth aspect of one embodiment is a gas dissolved liquid manufacturing device according to the first aspect, wherein a plate is provided at or above a liquid level of the gas-liquid separation tank, and the plate is disposed so that a gas-liquid mixture flowing into the gas-liquid separation tank through the pipe directly hits the plate.

According to this configuration, air bubbles can be fined by the gas-liquid mixture directly hitting the plate, so that the gas-liquid contact area can be improved, and the dissolution of the gas is promoted.

The gas dissolved liquid manufacturing device according to an eleventh aspect of one embodiment is a gas dissolved liquid manufacturing device according to any one of the first to tenth aspect, wherein the nozzle is provided at a portion of the pipe, the portion being connected substantially vertically to the gas-liquid separation tank.

According to this configuration, in the vicinity of the water surface inside the gas-liquid separation tank, a complicated flow of bubbles and liquid is formed, and the frequency of gas-liquid contact increases, so that gas solubility can be improved.

Before describing the embodiment, a comparative example will be described so that the problem of the present embodiment can be better understood.

Comparative Example

Figure 20:
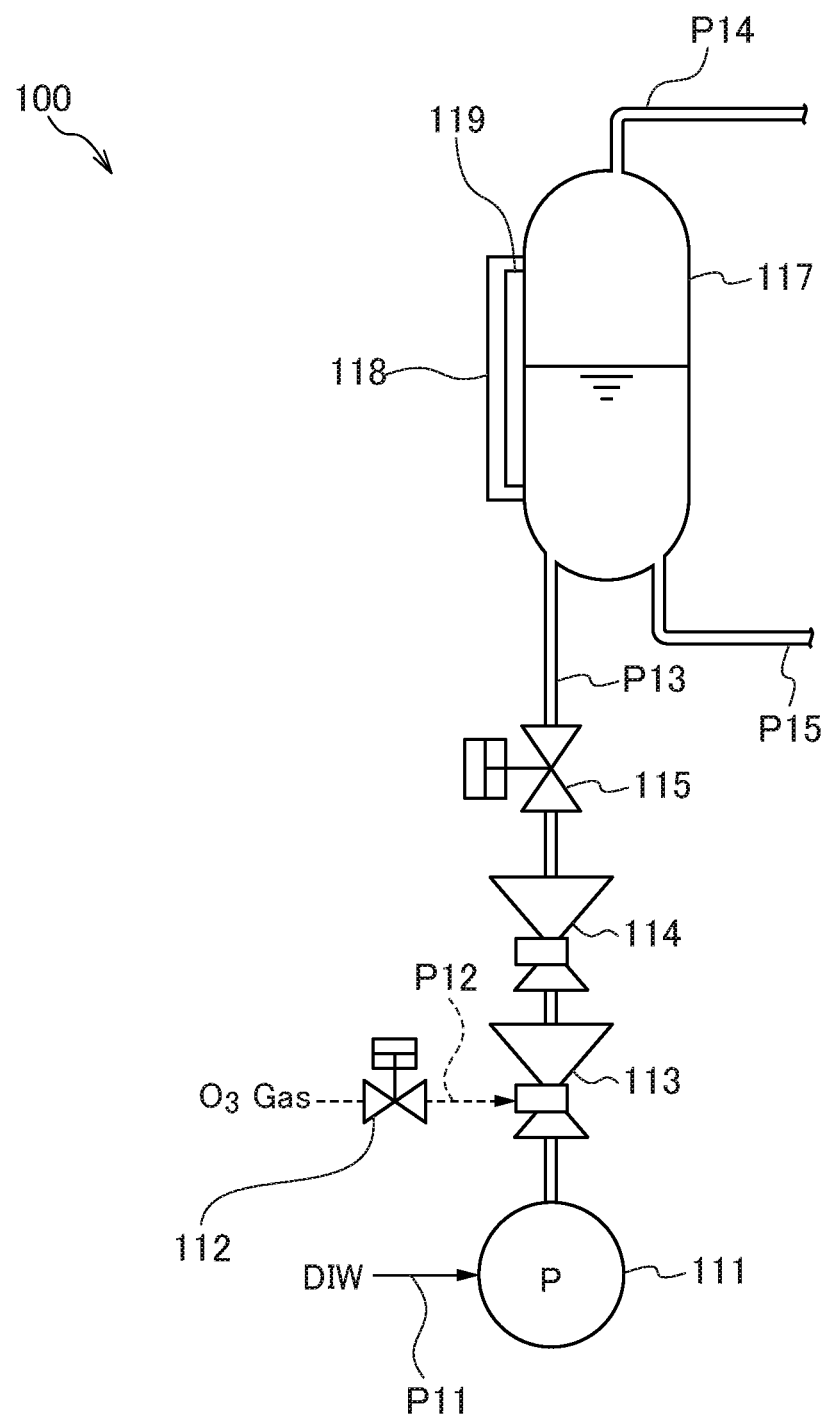
FIG. 20 is a schematic diagram of a gas dissolved liquid manufacturing device according to a comparative example.

FIG. 20 is a schematic diagram of a gas dissolved liquid manufacturing device according to a comparative example. As shown in FIG. 20, a gas dissolved liquid manufacturing device 100 according to the comparative example includes a pump 111, a pipe P11 for supplying ultrapure water (DIW) to the pump 111, a pipe P12 through which ozone gas passes, and a valve 112 provided in the pipe P12. The valve 112 is an air-driven valve. Further, the gas dissolved liquid manufacturing device 100 includes a gas-liquid separation tank 117, a pipe P13 for supplying ultrapure water (DIW) discharged from the pump 111 to the gas-liquid separation tank 117, and nozzles 113 and 114 and a valve 115 provided in the pipe P13. The valve 115 is an air-driven valve.

Further, the gas dissolved liquid manufacturing device 100 includes a liquid level monitoring sensor mounting tube 118 and a liquid level monitoring sensor 119 attached by the liquid level monitoring sensor mounting tube 118 is provided. A pipe P14 for discharging the excess gas is connected to the gas-liquid separation tank 117, and a pipe P15 for discharging the gas-liquid separated liquid is connected to the gas-liquid separation tank 117.

As shown in FIG. 20, a mixture of liquid and gas is introduced into the gas-liquid separation tank 117 from vertically downward to upward.

Figure 21:
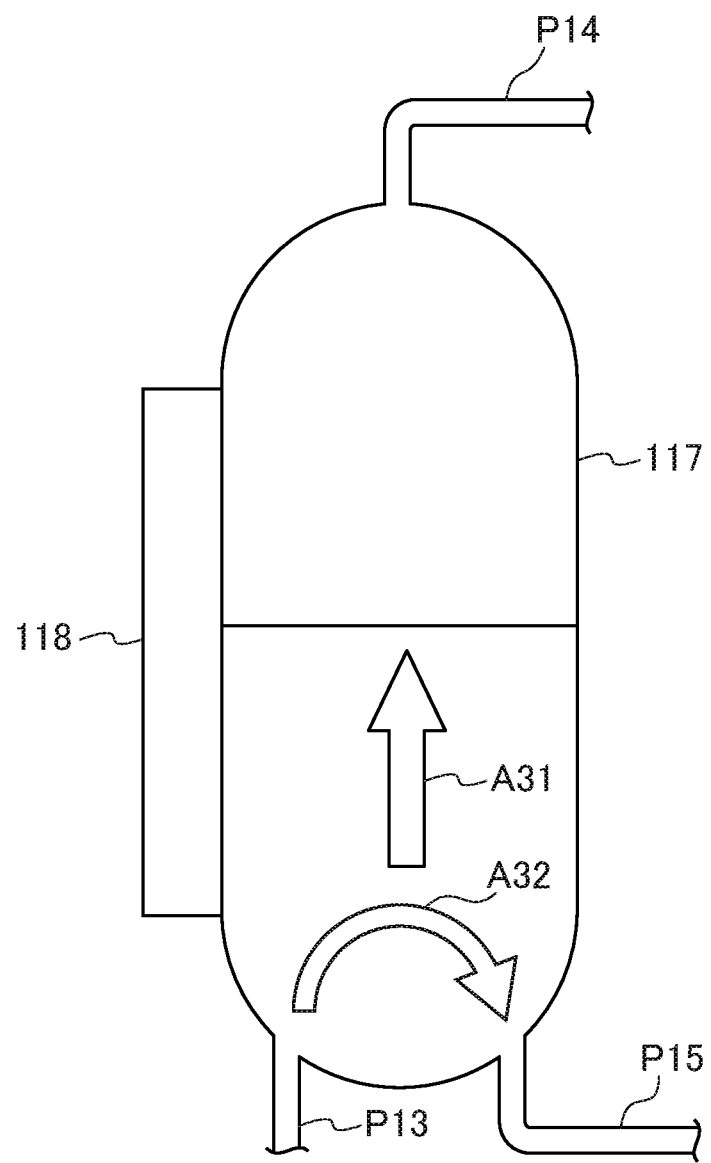
FIG. 21 is a schematic diagram illustrating flows of gas and liquid in a gas-liquid separation tank according to the comparative example.

FIG. 21 is a schematic diagram illustrating flows of gas and liquid in a gas-liquid separation tank according to the comparative example. As shown in FIG. 21, the gas goes upward in the liquid staying inside the gas-liquid separation tank 117, and the liquid subjected to the gas-liquid separation goes downward to perform smooth gas-liquid separation. Because the gas-liquid separation was so smooth, it is not possible to secure a long contact time between the dissolved gas and the liquid. As a result, the gas dissolution efficiency cannot be raised to the target (for example, the maximum).

The Embodiment

On the other hand, an object of the present embodiment is to improve gas solubility. More specifically, an object of the present invention is to improve gas solubility while achieving smooth gas-liquid separation. Therefore, gas-liquid contact in the present embodiment is performed more efficiently than that in the comparative example.

FIG. 1 is a schematic diagram of a gas dissolved liquid manufacturing device according to a first embodiment. As shown in FIG. 1, a gas dissolved liquid manufacturing device 1 according to the first embodiment includes a pump 11 that pressurizes a liquid (here, for example, ultrapure water), a pipe P1 for supplying the liquid (here, for example, ultrapure water (DIW)) to the pump 11, a pipe P2 through which ozone gas passes, and a valve 12 provided in the pipe P2. The valve 12 is, for example, an air-driven valve. Further, the gas dissolved liquid manufacturing device 1 includes a gas-liquid separation tank 17, a pipe P3 communicating with the pump 11 and supplying ultrapure water (DIW) discharged from the pump 11 to the gas-liquid separation tank 17, and a nozzle 13, a valve 14, and nozzles 15 and 16 provided in the pipe P3. The nozzles 13, 15, and 16 are configured to generate micro bubbles using supplied gas (here, ozone gas as an example), and, for example, is a micro bubble generating nozzle. Here, the micro bubble generating nozzle is a nozzle that can generate bubbles up to several mm in diameter called micro bubbles and nano bubbles, for example, using a swirling flow, and an aspirator and an ejector can also be used. In the present embodiment, the ozone gas is supplied to the nozzle 13 from the ozone gas generator (not shown) via the valve 12. The material gas (oxygen, nitrogen, $CO_2$) supplied to the ozone gas generator (not shown) is supplied by controlling the flow rate by a mass flow controller (not shown). The valve 14 is, for example, an air-driven valve.

For example, the pipe P3 is formed in a U shape, and the nozzle 13 is provided at a pipe extending upward from the pump 11.

In this way, when there is a portion where the gas-liquid mixture flows horizontally and vertically downward before the pipe P3 after leaving the pump 11 reaches the gas-liquid separation tank 17, a gas-liquid separation state is already achieved in a pipe, of the pipe P3, extending substantially horizontally (hereinafter, referred to as horizontal pipe) with the liquid on the lower side and the gas on the upper side. This state of the gas-liquid separation also causes a reduction in the contact area between the liquid and the gas. Therefore, in order to eliminate this situation, in the present embodiment, as shown in FIG. 1, a nozzle 15 is provided at a horizontal pipe of the pipe P3. As a result, the gas-liquid that has passed through the nozzle 15 is mixed again, the air bubbles are in a fined state, and the state where the gas-liquid contact area is large can be maintained.

Even in the gas-liquid that has passed through the nozzle 15, the air bubbles aggregate with each other and increase the diameter. This reduces the gas-liquid contact area. For this reason, to eliminate this situation, in this embodiment, as shown in FIG. 1, a nozzle 16 is provided in a portion, of the pipe P3, that is substantially vertically connected to the gas-liquid separation tank 17. As a result, the nozzle 16 further fines the air bubbles, and achieves a state where the gas-liquid contact area is large, so that the solution can be supplied to the gas-liquid separation tank.

The internal diameter of the gas-liquid separation tank 17 is defined as D, and the internal diameter of the pipe P3 for supplying the gas-liquid mixture is defined as d, the flow rate of the liquid of the gas-liquid mixture supplied from above to the gas-liquid separation tank 17 via the pipe P3 is defined as F, and the gas flow rate contained in the gas-liquid mixture is defined as f. In this case, it is preferable to supply a gas-liquid mixture having a mixing ratio of $0<f/F\leq5$ for the gas-liquid separation tank 17 and the pipe P3 having a length ratio of the inner diameter of $0<d/D\leq0.5$ into the gas-liquid separation tank 17 from above. As a result, in the vicinity of the water surface inside the gas-liquid separation tank 17, a complicated flow of bubbles and liquid is formed, and the frequency of gas-liquid contact increases, so that gas solubility can be improved.

Further, the gas dissolved liquid manufacturing device 1 includes a liquid level monitoring sensor mounting tube 18 and a liquid level monitoring sensor 19 attached to the side face of the gas-liquid separation tank 117 by the liquid level monitoring sensor mounting tube 18. A pipe P4 for discharging the excess gas is connected to the gas-liquid separation tank 17, and a pipe P5 for discharging the gas-liquid separated liquid is connected to the gas-liquid separation tank 17. The liquid level monitoring sensor 19 is, for example, a capacitance type liquid level detection sensor, and electrodes are attached to the side face of the gas-liquid separation tank 117 by the liquid level monitoring sensor mounting tube 18 to detect the liquid level in the gas-liquid separation tank 117. Here, the capacitance type liquid level detection sensor employs a detection method utilizing the fact that the inherent dielectric constant of the liquid is different from that of air. In addition, the liquid level monitoring sensor 19 is not limited to the capacitance type liquid level detection sensor, but may be another sensor that is in contact with the liquid level, or another sensor that does not contact the liquid level.

As shown in FIG. 1, the upper part of the gas-liquid separation tank 17 communicates with the pipe P3. The gas-liquid mixture can be introduced vertically downward from the upper part of the gas-liquid separation tank 17. The gas-liquid separation tank 17 separates the gas-liquid mixture generated by the nozzle 13 into a gas and a liquid. The gas dissolved liquid manufacturing device 1 includes the pipe P4 communicating with the upper part of the gas-liquid separation tank 17 and discharging the excess gas and the pipe P5 communicating with the lower part of the gas-liquid separation tank 17 and discharging the gas-liquid separated liquid.

Further, the gas dissolved liquid manufacturing device 1 includes a pressure sensor 21 provided on the pipe P5, a pressure regulating valve 22 provided at the pipe P4, and a control unit 24 connected to the pressure sensor 21 and the pressure regulating valve 22 via a signal line. The gas-liquid separation tank 17 is pressurized, and the pressure sensor 21 detects the pressure of the liquid discharged from the gas-liquid separation tank 17. The control unit 24 acquires the pressure, of the liquid to be ejected, which is detected by the pressure sensor 21, from the pressure sensor 21, to control the opening degree of the pressure regulating valve 22 so that the pressure of the discharged liquid becomes a constant value. As a result, the control unit 24 automatically adjusts the opening degree of the pressure regulating valve 22, whereby the pressure in the gas-liquid separation tank 17 is maintained at a predetermined internal pressure. Thereby, the pressure in the gas-liquid separation tank 17 can be maintained at a high state, so that the gas solubility can be improved.

Figure 2:
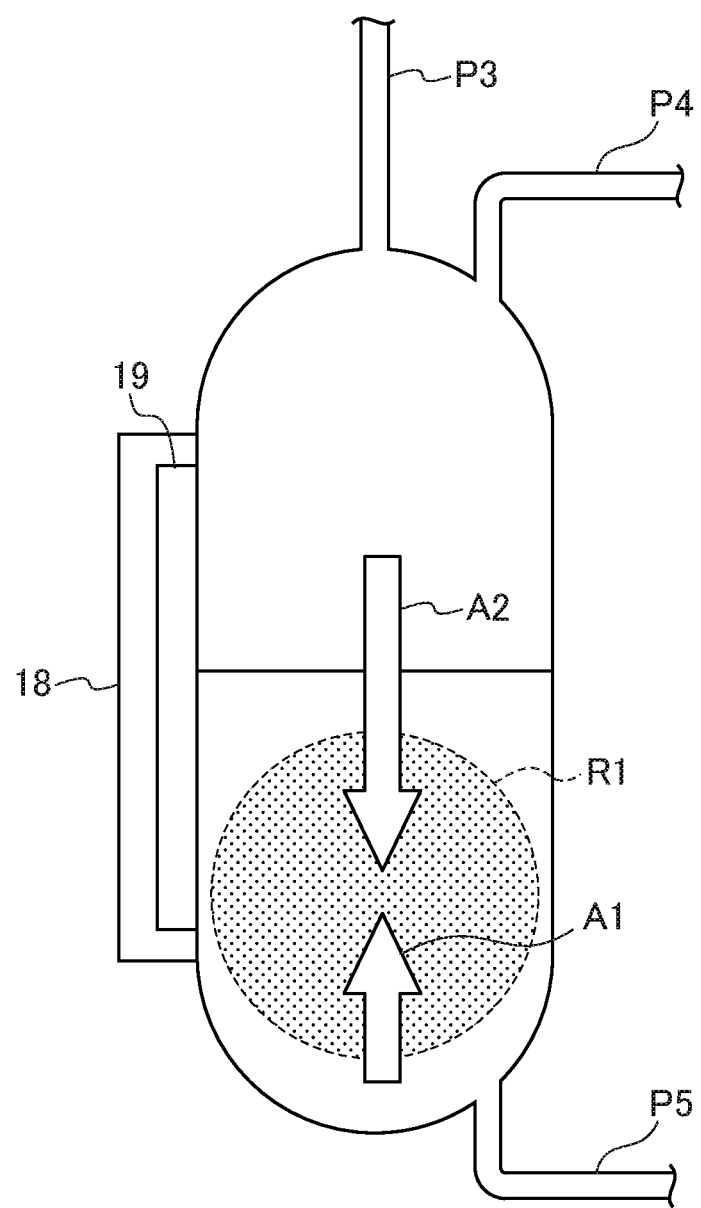
FIG. 2 is a schematic diagram showing flows of gas and liquid in the gas-liquid separation tank according to the first embodiment.

FIG. 2 is a schematic diagram showing flows of gas and liquid in the gas-liquid separation tank according to the first embodiment. As shown in FIG. 2, the gas going upwards as shown by arrow A1 and the liquid going downward as shown by the arrow A2 oppose each other to form a complicated flow in the region R1 inside the gas-liquid separation tank 17. Therefore, the gas-liquid contact time can be kept longer than that of the comparative example, and the gas dissolution efficiency can be increased. As a result, a gas dissolved liquid having a higher concentration can be obtained.

As described above, the gas dissolved liquid manufacturing device 1 according to the first embodiment includes the pump 11 that pressurizes a liquid, the pipe P3 communicating with the pump 11, a nozzle 13 which is disposed in the pipe P3, and that generates micro bubbles using the supplied gas, a gas-liquid separation tank 17 whose upper part communicates with the pipe P3, where the gas-liquid separation tank 17 is configured to separate the gas-liquid mixture generated by the nozzle 13 into a gas and a liquid.

With this configuration, the gas-liquid mixture flows in from the upper part of the gas-liquid separation tank 17, so that the gas going upwards and the liquid going downward oppose each other to form a complex flow inside the gas-liquid separation tank. Therefore, the gas-liquid contact time can be kept longer than that in the comparative example, and the gas dissolution efficiency can be improved. As a result, a gas dissolved liquid having a higher concentration can be obtained.

In addition, the gas dissolved liquid manufacturing device 1 may further include a concentration meter, for example, in the pipe P5. In this case, the control unit 24 compares the current ozone concentration in the gas-liquid separated liquid with the set concentration, and may increase or decrease the amount of ozone gas by increasing or decreasing the flow rate of oxygen gas as a source gas, or may increase or decrease the discharge power of an ozone gas generator (not shown) configured to generate ozone gas according to the comparison result.

Modification of First Embodiment

Figure 3:
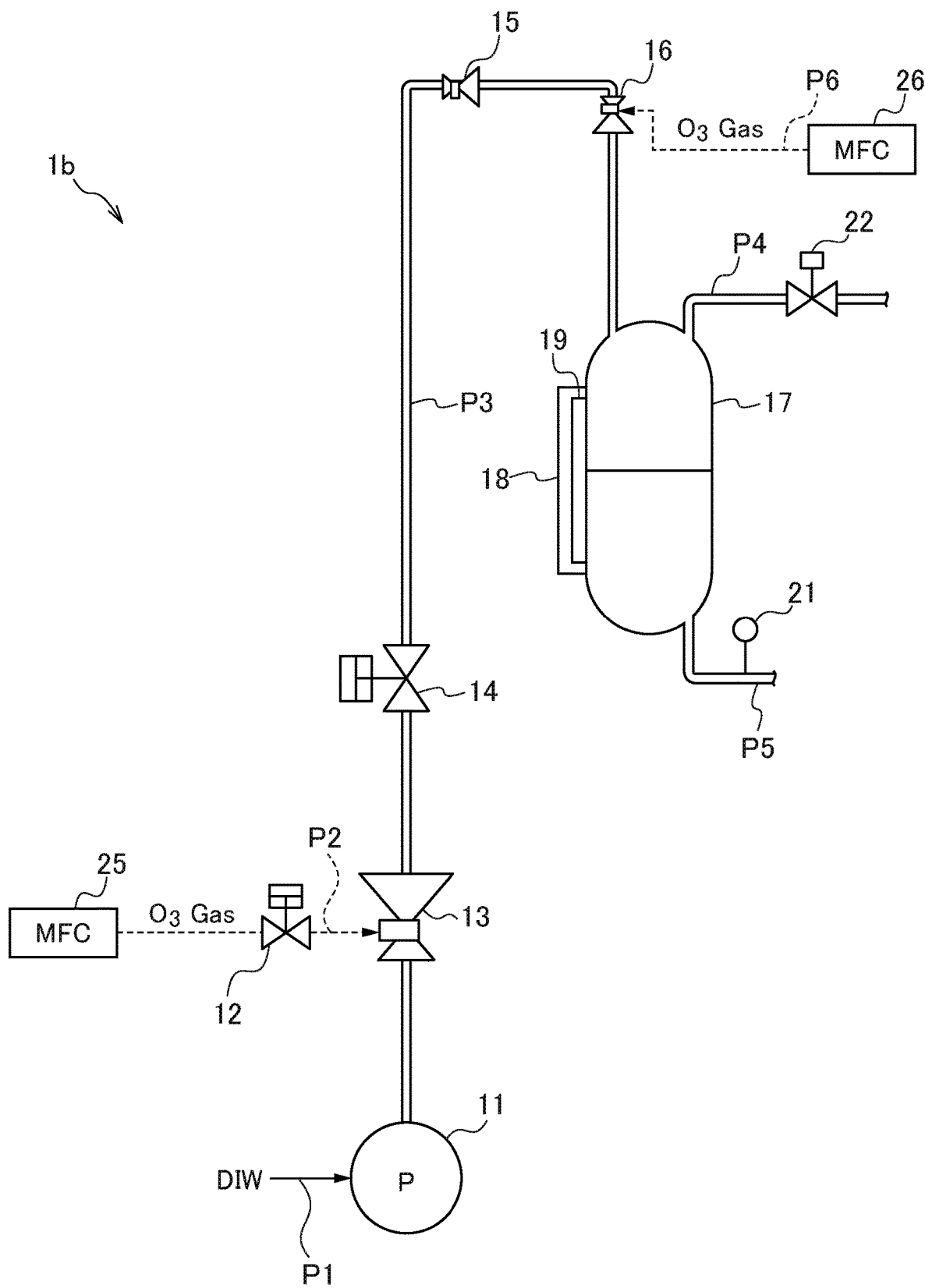
FIG. 3 is a schematic diagram of a gas dissolved liquid manufacturing device according to a modification of the first embodiment.

In a modification of the first embodiment, ozone gas is also supplied to the nozzle 16. FIG. 3 is a schematic diagram of a gas dissolved liquid manufacturing device according to a modification of the first embodiment. The same elements as those in FIG. 1 are denoted by the same reference numerals, and description thereof will be omitted. Also, the wiring between the control unit 24, and the pressure sensor 21 and the pressure regulating valve 22 is omitted. As shown in FIG. 3, the ozone gas may be supplied not only from the nozzle 13, but also from the nozzle 15 and/or the nozzle 16 (in FIG. 3, from the nozzle 16 as an example). The gas flow supplied to the nozzle 13, the nozzle 15, and/or the nozzle 16 needs to be individually controlled by using a mass flow controller (MFC). This is because when one gas line is branched and a gas is supplied to nozzles 13, 15, and 16, one-sided flow will occur and a desired flow rate cannot be flowed to a desired nozzle.

In FIG. 3, as an example, a gas dissolved liquid manufacturing device 1b according to the modification of the first embodiment is different from the gas dissolved liquid manufacturing device 1 according to the first embodiment in that the gas dissolved liquid manufacturing device 1b includes a mass flow controller 25 that communicates with the pipe P2 and controls the flow rate of the amount of ozone gas supplied to the nozzle 13, a mass flow controller 26 that controls the flow rate of the amount of ozone gas supplied to the nozzle 16, and a pipe P6 having one end communicating with the mass flow controller 26 and the other end communicating with the nozzle 16. This allows a desired flow rate to flow through each of the nozzles 13 and 16.

Second Modification of First Embodiment

Figure 4:
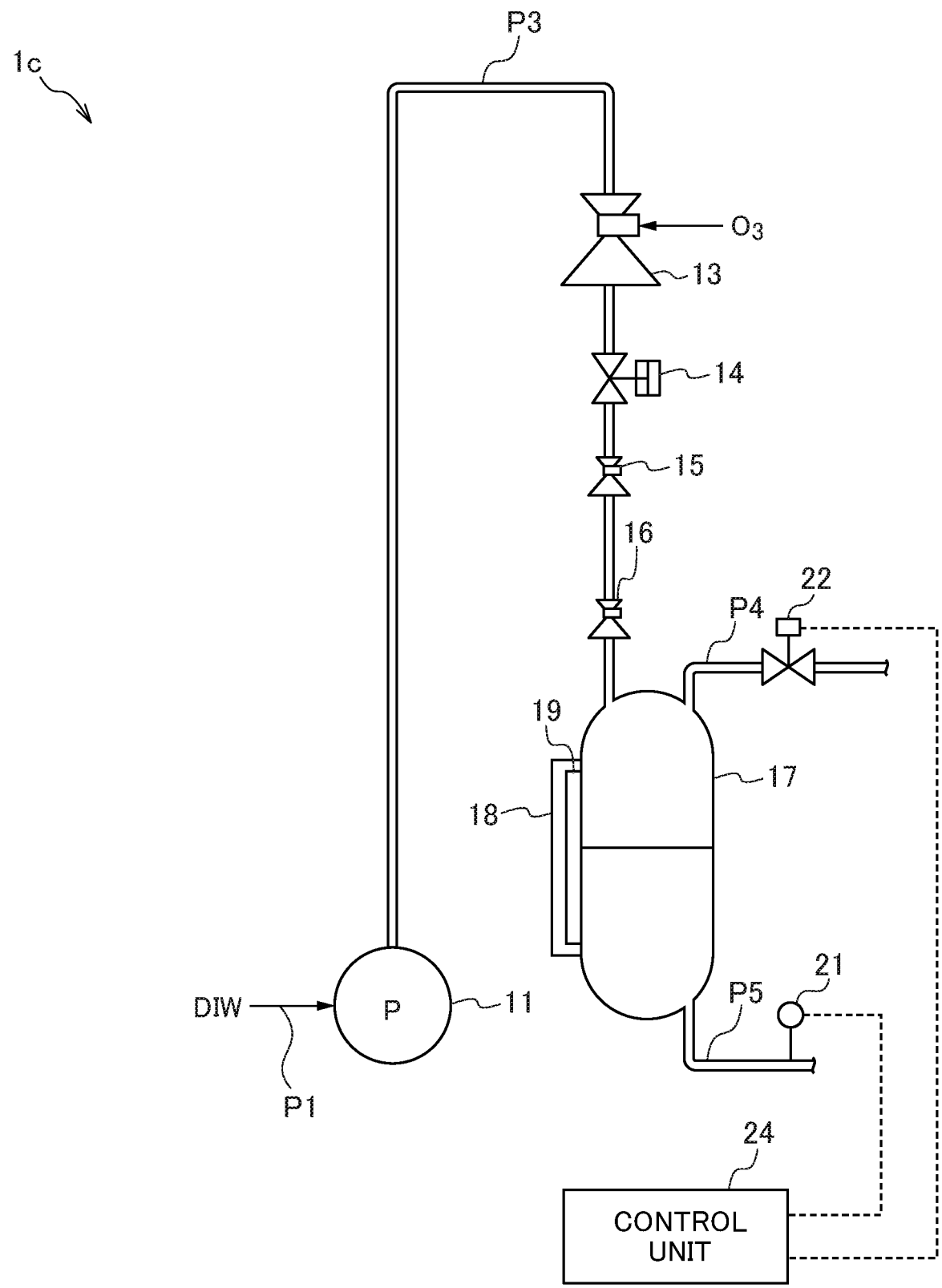
FIG. 4 is a schematic diagram of a gas dissolved liquid manufacturing device according to a second modification of the first embodiment.

FIG. 4 is a schematic diagram of a gas dissolved liquid manufacturing device according to a second modification of the first embodiment. The same elements as those in FIG. 1 are denoted by the same reference numerals, and description thereof will be omitted. As shown in FIG. 4, a gas dissolved liquid manufacturing device 1c according to the second modification of the first embodiment is different from the gas dissolved liquid manufacturing device 1b according to the first embodiment in that not only the nozzle 16 but also the nozzles 13, 15 and the valve 14 are provided at a pipe, of the pipe P3, which extends vertically downward and communicates with the gas-liquid separation tank 17.

In this way, the nozzle 13 for supplying a dissolved gas (here, as an example, ozone gas) into the gas-liquid separation tank 17 may be disposed at a pipe into which the gas-liquid mixture flows vertically downward. As a result, since the liquid flows downward in gas and liquid flowing vertically downward, and the gas resists to flow upward, it is possible to maintain a large gas-liquid contact area. As a result, it is possible to prevent a phenomenon in which gas and liquid are separated in a pipe running horizontally after gas introduction, as in the first embodiment.

Further, as shown in FIG. 4, the nozzles 15 and 16 may be attached in order to fine the air bubbles that aggregate with each other and are about to grow. Further, a gas (here, an ozone gas as an example) may be supplied to the nozzles 15 and 16 to generate micro bubble again.

Second Embodiment

The flow rate of the gas-liquid mixture flowing into the gas-liquid separation tank fluctuates. In a case where the sectional area inside the gas-liquid separation tank is the same, when the flow rate is large, a complicated flow is formed to the extent that reaches the inner wall of the gas-liquid separation tank. Since the flow hits the inner wall, gas-liquid contact is promoted, which has the effect of promoting gas dissolution. When the flow rate is small, the complicated flow does not reach the side wall, and the effect of gas-liquid contact is reduced. The second embodiment improves the effect so that gas-liquid contact is promoted even when the flow rate is small.

Figure 5:
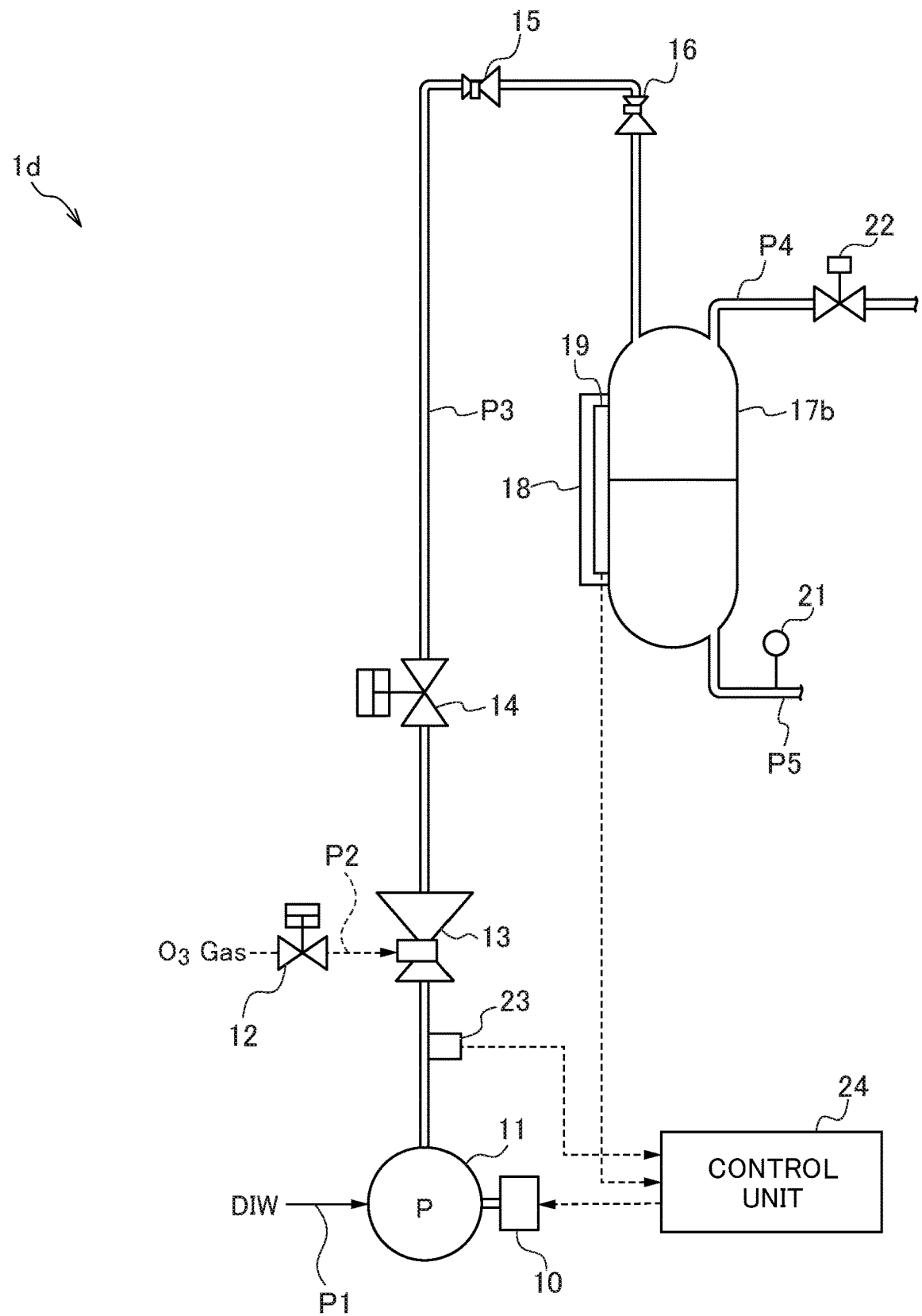
FIG. 5 is a schematic diagram of a gas dissolved liquid manufacturing device according to the second embodiment.

FIG. 5 is a schematic diagram of a gas dissolved liquid manufacturing device according to the second embodiment. The same elements as those in FIG. 1 are denoted by the same reference numerals, and description thereof will be omitted. Further, the wiring between the control unit 24, the pressure sensor 21, and the pressure regulating valve 22 is also omitted. As shown in FIG. 5, a gas dissolved liquid manufacturing device 1d according to the second embodiment is different from the gas dissolved liquid manufacturing device 1 according to the first embodiment in that the internal structure of a gas-liquid separation tank 17b is changed, and a flow rate sensor 23 and the control unit 24 that controls the pump 11 are further provided. The flow rate sensor 23 is provided at the pipe P3 between the pump 11 and the nozzle 13, and detects the flow rate of the liquid discharged from the pump 11. That is, the flow rate sensor 23 detects the flow rate of the liquid supplied to the gas-liquid separation tank 17b. The control unit 24 is connected to the flow rate sensor 23, and acquires the flow rate detected by the flow rate sensor 23 from the flow rate sensor 23. The control unit 24 is connected to the liquid level monitoring sensor 19, and acquires the liquid level height detected by the liquid level monitoring sensor 19 from the liquid level monitoring sensor 19.

The gas-liquid separation tank 17b has a sectional area of the space through which the liquid can pass decreasing as going downward. The control unit 24 controls the pump 11 so that the lower the flow rate measured by the flow rate sensor 23, the lower the liquid level is kept. With this configuration, even when the flow rate flowing into the gas-liquid separation tank 17b fluctuates, the complex flow formed by a gas and a liquid does not leave the inner wall of the gas-liquid separation tank 17b, so that stable gas-liquid contact using the inner wall can be achieved, and gas solubility can be improved. This specific example will be described below with reference to FIGS. 6 to 8.

Figure 6:
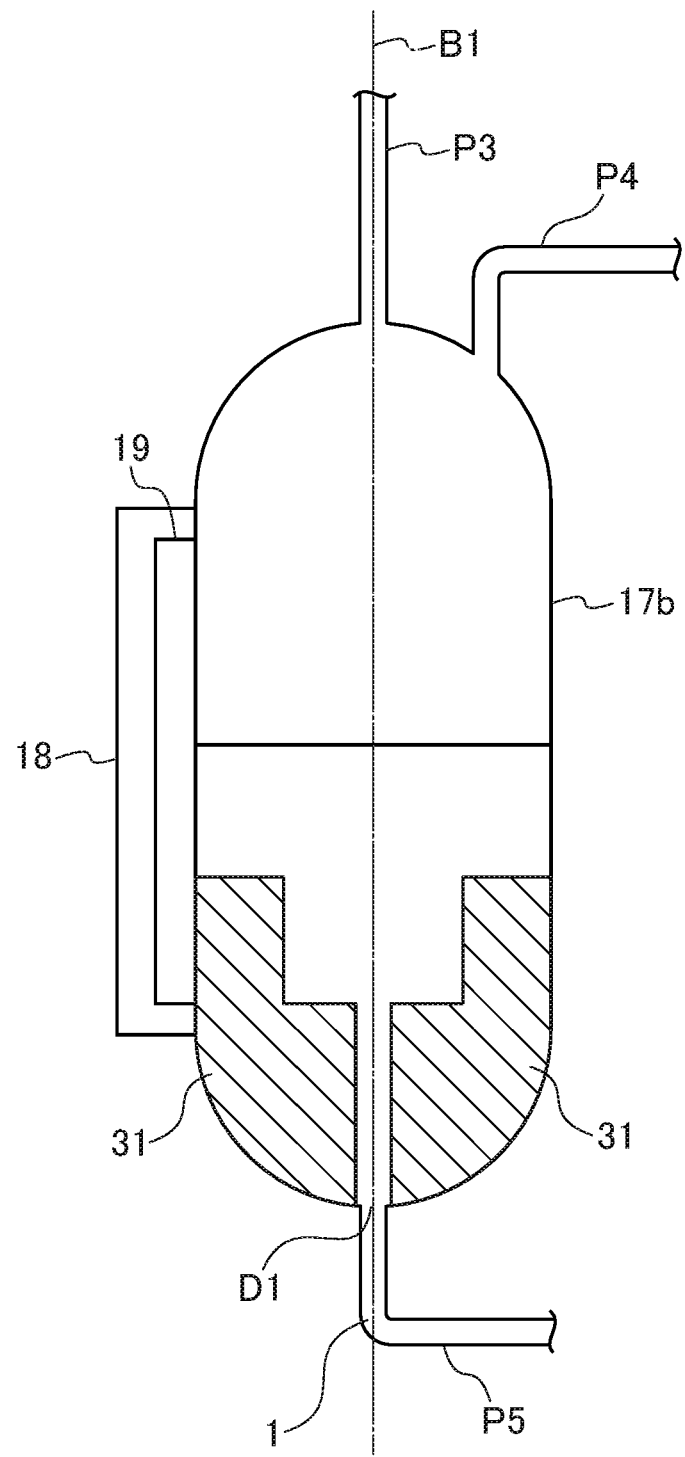
FIG. 6 is a schematic longitudinal sectional view of the gas-liquid separation tank according to the second embodiment.

FIG. 6 is a schematic longitudinal sectional view of the gas-liquid separation tank according to the second embodiment. In the example of FIG. 6, a flow path adjustment member 31 configured to form a discharge port D1 through which a gas-liquid mixture is discharged and a flow path to the discharge port D1 is provided inside the gas-liquid separation tank 17b. The sectional area of the flow path is smaller than the sectional area of the gas-liquid separation tank 17b. In the example of FIG. 6, the flow path adjustment member 31 is axially symmetric with respect to the longitudinal axis B1 of FIG. 6. The flow path adjustment member 31 may be formed integrally with the gas-liquid separation tank 17b, or may be fixed to the gas-liquid separation tank 17b after being formed separately from the gas-liquid separation tank 17b.

Figure 7:
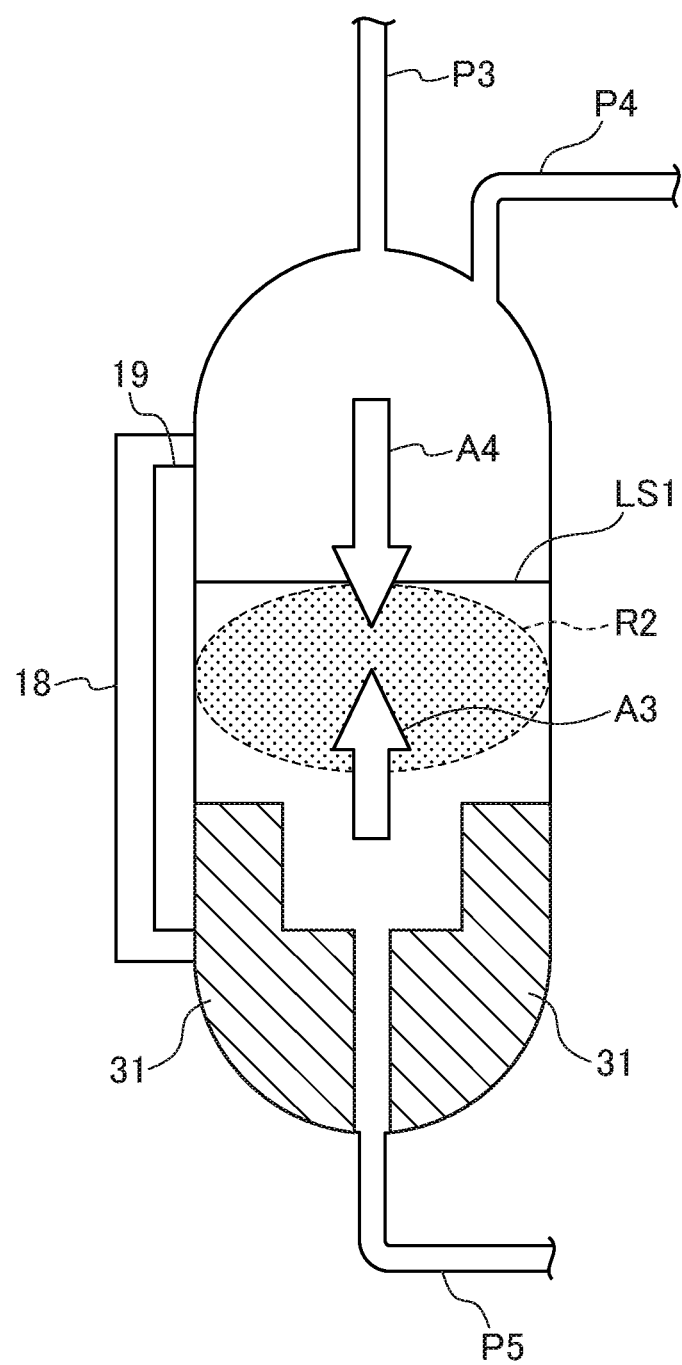
FIG. 7 is a schematic diagram showing an example of a position of the liquid level to be controlled when the flow rate flowing into the gas-liquid separation tank is large.

FIG. 7 is a schematic diagram showing an example of a position of the liquid level to be controlled when the flow rate flowing into the gas-liquid separation tank is large. As shown in FIG. 7, the control unit 24 controls the flow rate by controlling a driving device 10 that drives the pump 11 so as to keep the liquid level at a position above the flow path adjustment member 31 (for example, the position of the liquid level LS1 in the case of FIG. 7) when the flow rate measured by the flow rate sensor 23 exceeds the threshold. Here, the driving device 10 is, for example, an electric motor.

Thus, a large amount of gas moves as shown by arrow A3 and a large amount of liquid moves as shown by arrow A4 when the flow rate exceeds the threshold, so that the complicated flow region R2 formed by the gas and the liquid can reach the inner wall of the gas-liquid separation tank 17b. As a result, stable gas-liquid contact using the inner wall of the gas-liquid separation tank 17b can be achieved, and the gas solubility can be improved.

Figure 8:
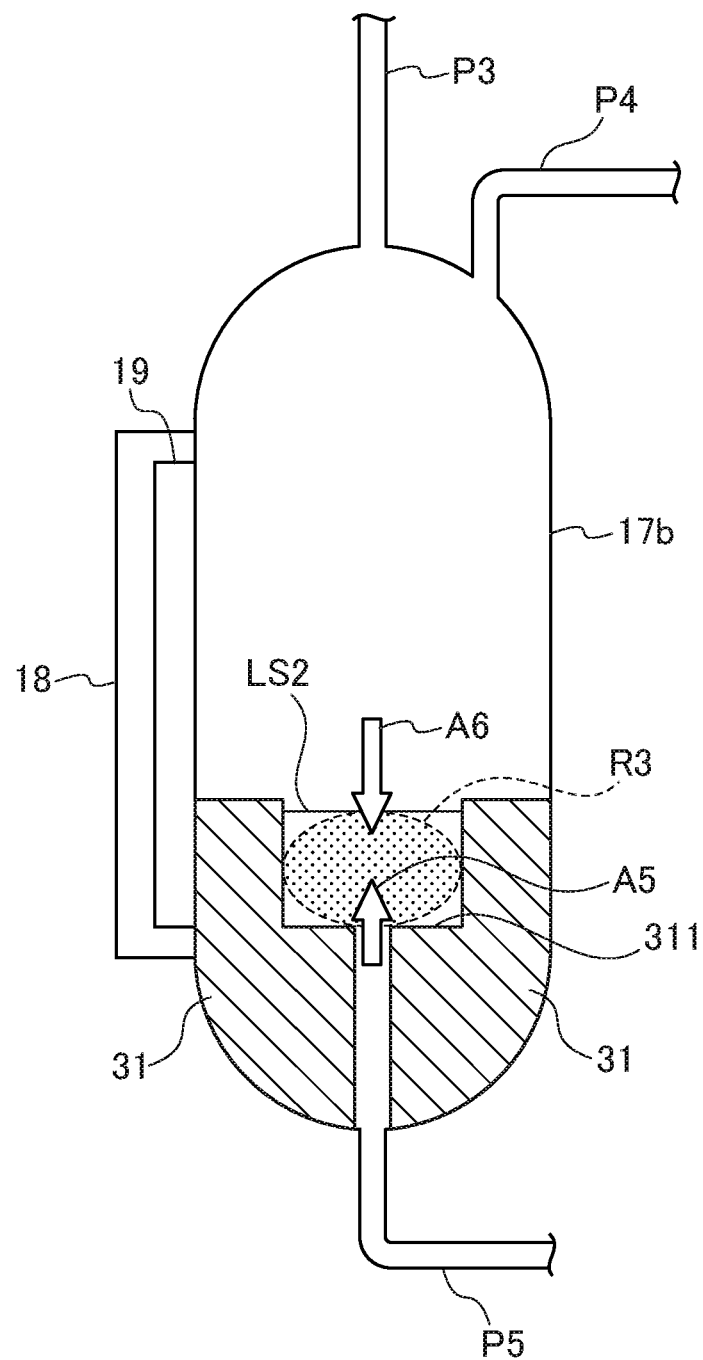
FIG. 8 is a schematic diagram showing an example of a position of the liquid level to be controlled when the flow rate flowing into the gas-liquid separation tank is small.

FIG. 8 is a schematic diagram showing an example of a position of the liquid level to be controlled when the flow rate flowing into the gas-liquid separation tank is small. As shown in FIG. 8, the control unit 24 controls the flow rate by controlling a driving device 10 that drives the pump 11 so as to keep the liquid level in the flow path formed by the flow path adjustment member 31 (for example, the position of the liquid level LS2 in the case of FIG. 8) when the flow rate measured by the flow rate sensor 23 is equal to or less than the threshold.

Thus, a small amount of gas moves as shown by arrow A5 and a small amount of liquid moves as shown by arrow A6 when the flow rate is equal to or less than the threshold. For this reason, even when the complicated flow region R3 formed by gas and liquid is small, the liquid level is kept in the flow path formed by the flow path adjustment member 31, so that the complicated flow region R3 can reach the inner wall of the flow path adjustment member 31. As a result, stable gas-liquid contact using the inner wall of the flow path adjustment member 31 can be achieved, and the gas solubility can be improved.

Further, as shown in FIG. 8, a step 311 is provided on the inner wall of the flow path adjustment member 31. With this configuration, the sectional area through which the liquid can pass from the upper side to the lower side can be reduced by one step, so that the complicated flow region R3 formed by the gas and the liquid can be kept in a space above the step 311.

Here, the space of the flow path adjustment member 31 is configured such that the sectional area through which the liquid can pass from the upper side to the lower side is reduced by one step, but the present invention is not limited to this. A plurality of steps may be provided so that the sectional area through which the liquid can pass from the upper side to the lower side decreases by two or more steps. That is, the space of the flow path adjustment member may be configured such that the sectional area through which the liquid can pass from the upper side to the lower side decreases by at least one step.

First Modification of Second Embodiment

Figure 9:
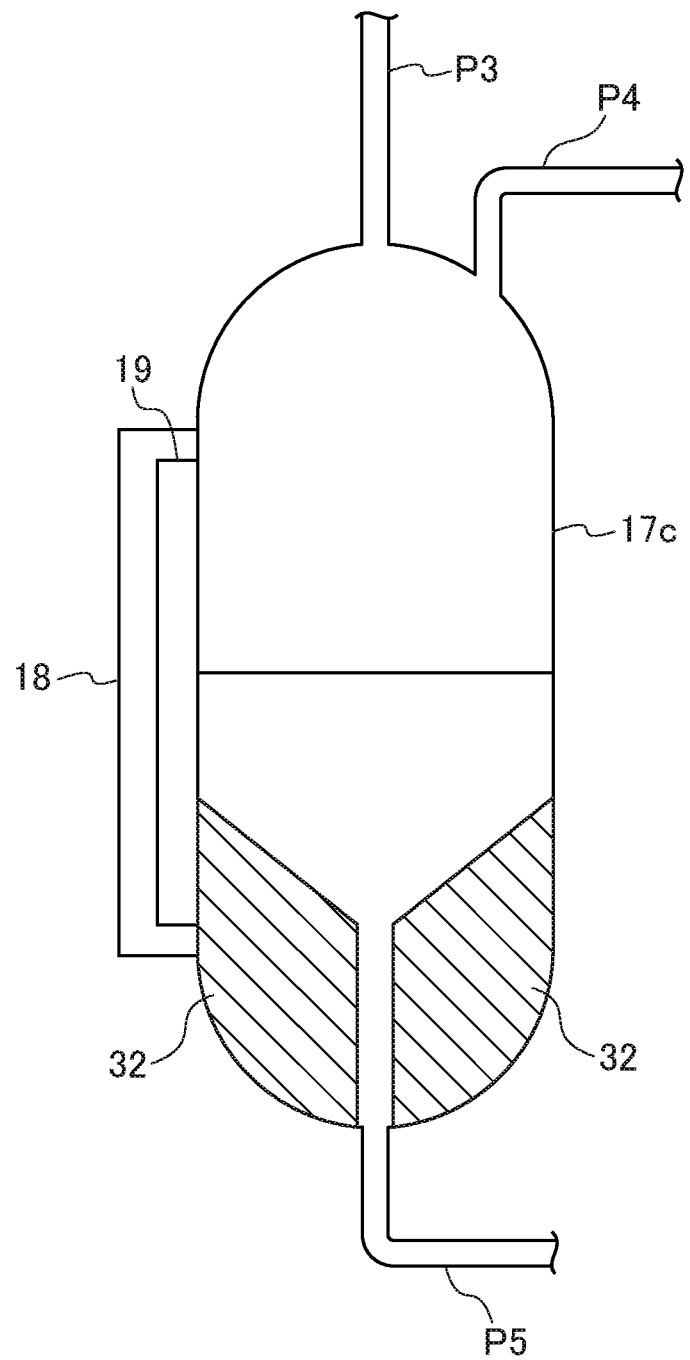
FIG. 9 is a schematic longitudinal sectional view of a gas-liquid separation tank according to the first modification of the second embodiment.

Next, the first modification of the second embodiment will be described. FIG. 9 is a schematic longitudinal sectional view of a gas-liquid separation tank according to the first modification of the second embodiment. As shown in FIG. 9, in the first modification, a flow path adjustment member 32 having a different shape of a space (that is, a cavity) formed therein is provided in a gas-liquid separation tank 17c. The space (that is, the cavity) in the flow path adjustment member 32 has, for example, a funnel-like shape including an inverted cone shape, and the cross-sectional area of this space decreases continuously as it goes downward. In other words, the space in the flow path adjustment member 32 is such that the inclination is provided so that the sectional area through which the liquid can pass downward from above is continuously reduced, and the flow path is narrowed from the upper side to the lower side.

Also in this configuration, the control unit 24 may control the pump so that the lower the flow rate measured by the flow rate sensor 23, the lower the liquid level is kept. Specifically, for example, the control unit 24 may control the pump 11 so as to keep the liquid level at a position above the flow path adjustment member 32 when the flow rate measured by the flow rate sensor 23 exceeds a threshold, and may control the pump so as to keep the liquid level in the flow path formed by the flow path adjustment member 32 when the flow rate measured by the flow rate sensor 23 is equal to or less than the threshold.

Second Modification of Second Embodiment

Figure 10:
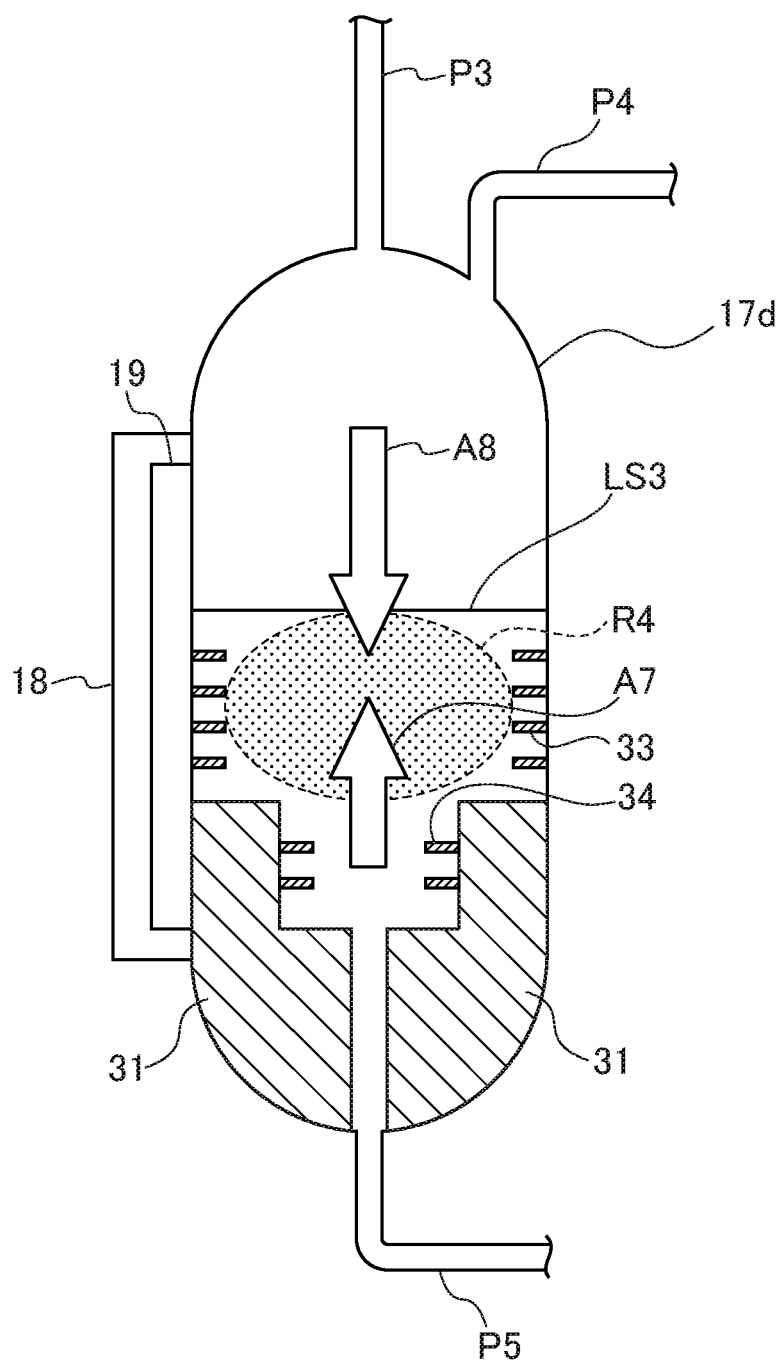
FIG. 10 is a schematic longitudinal sectional view of a gas-liquid separation tank according to the second modification of the second embodiment when the flow rate flowing into the gas-liquid separation tank is large.

Next, the second modification of the second embodiment will be described. FIG. 10 is a schematic longitudinal sectional view of a gas-liquid separation tank according to the second modification of the second embodiment when the flow rate flowing into the gas-liquid separation tank is large. As shown in FIG. 10, in the first modification, a protrusion 33 is provided on the inner wall of a gas-liquid separation tank 17d. Note that, instead of or in addition to the protrusion 33, a structure with irregularity may be provided on the inner wall of the gas-liquid separation tank 17c. When the flow rate flowing into the gas-liquid separation tank exceeds the threshold, the control unit 24 keeps the liquid level LS3 on the flow path adjustment member 31. In this case, as described above, a complicated flow is formed in the region R4 by the gas flow indicated by the arrow A7 and the liquid flow indicated by the arrow A8. At this time, the complicated flow collides with the protrusion 33 or the structure, and a stirring effect is generated, and the dissolution of the gas is promoted.

Figure 11:
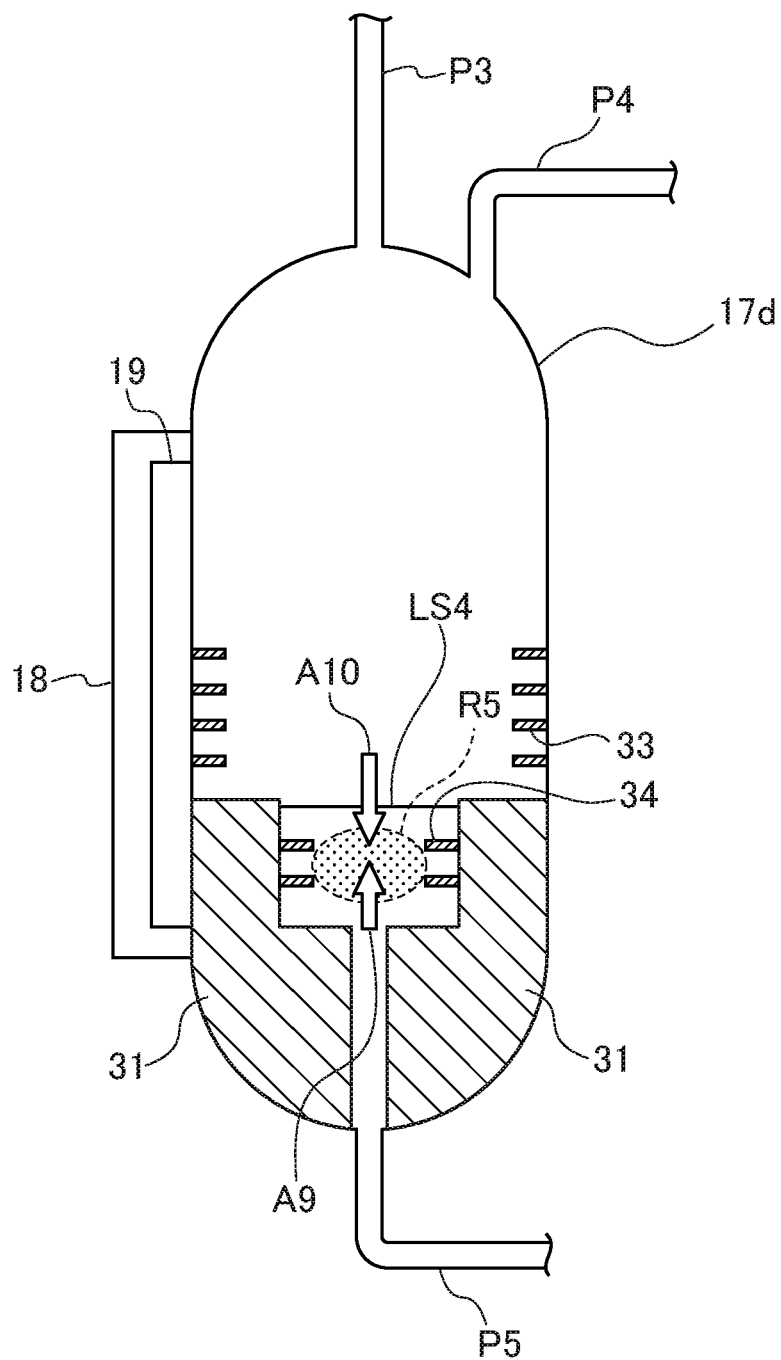
FIG. 11 is a schematic longitudinal sectional view of a gas-liquid separation tank according to the second modification of the second embodiment when the flow rate flowing into the gas-liquid separation tank is small.

FIG. 11 is a schematic longitudinal sectional view of a gas-liquid separation tank according to the second modification of the second embodiment when the flow rate flowing into the gas-liquid separation tank is small. As shown in FIG. 11, a protrusion 34 is provided on the inner wall of the flow path adjustment member 31. Note that, instead of or in addition to the protrusion 34, a structure with irregularity may be provided on the inner wall of the flow path adjustment member 31. When the flow rate into the gas-liquid separation tank is equal to or less than the threshold, the control unit 24 keeps the liquid level LS4 in the flow path formed by the flow path adjustment member 31. In this case, as described above, a complicated flow is formed in the region R5 by the gas flow indicated by the arrow A9 and the liquid flow indicated by the arrow A10. At this time, when a complicated flow collides with the protrusion 34 or the structure, a stirring effect is generated, and the dissolution of the gas is promoted.

The length of the protrusion 33 from the inner wall surface of the gas-liquid separation tank 17c is, for example, 0 to 10 mm. The length of the protrusion 34 from the inner wall surface of the flow path adjustment member 31 is, for example, 0 to 10 mm. The shapes of the protrusions 33 and 34 are not limited as long as gas and liquid collide with the protrusions 33 and 34 to generate a stirring effect and promote the gas dissolution.

Third Modification of Second Embodiment

Figure 12:
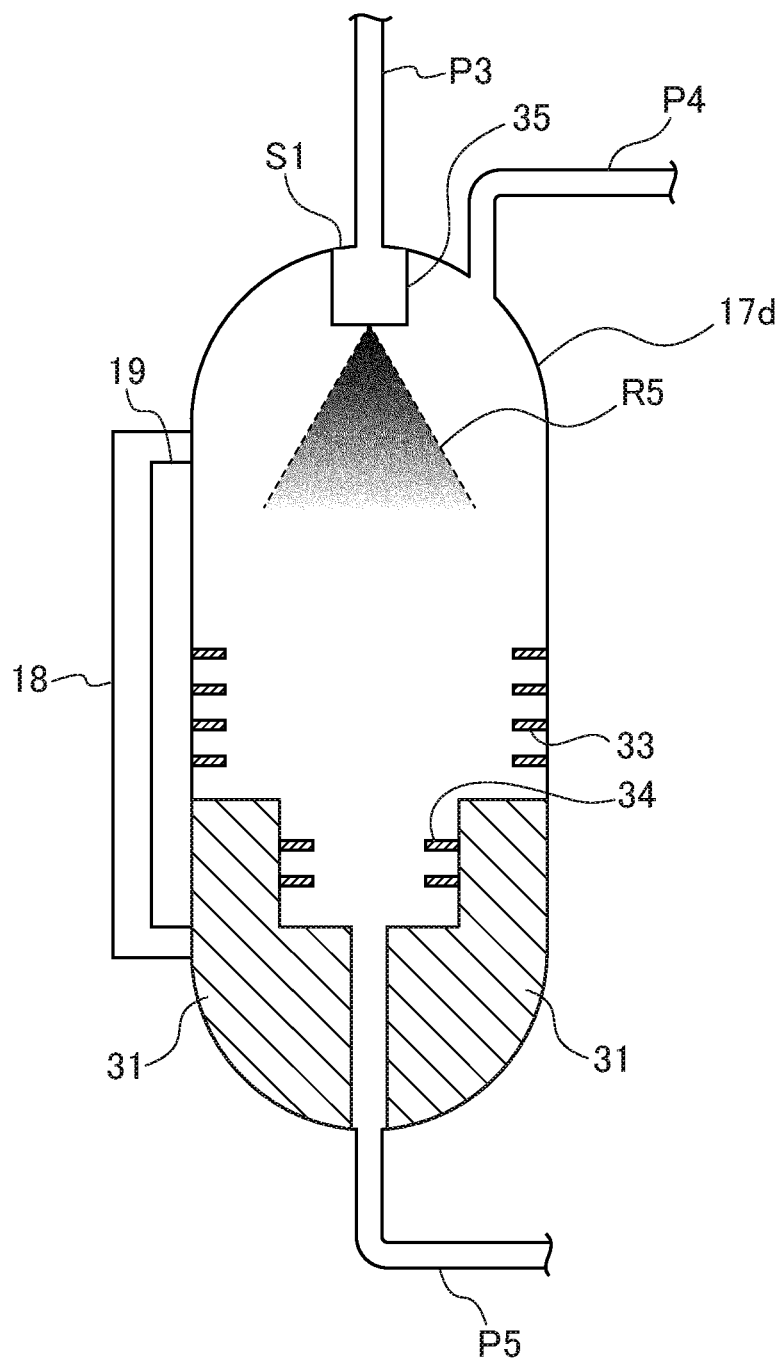
FIG. 12 is a schematic longitudinal sectional view of a gas-liquid separation tank according to the third modification of the second embodiment.

Next, the third modification of the second embodiment will be described. FIG. 12 is a schematic longitudinal sectional view of a gas-liquid separation tank according to the third modification of the second embodiment. The same elements as those in FIG. 10 are denoted by the same reference numerals, and description thereof will be omitted. As shown in FIG. 12, a supply port S1 communicating with the pipe P3 is provided at the upper part of the gas-liquid separation tank 17d. A gas-liquid separation tank 17e of the third modification of the second embodiment is different from the gas-liquid separation tank 17d of the second modification of the second embodiment in FIG. 10 in that a shower nozzle 35 communicating with the supply port S1 is further provided inside the gas-liquid separation tank 17d. The shower nozzle 35 sprays the supplied gas-liquid mixture and discharges it into the gas-liquid separation tank 17d. Thereby, the gas-liquid contact area can be increased, and the dissolution of the gas is promoted.

Fourth Modification of Second Embodiment

Figure 13A:
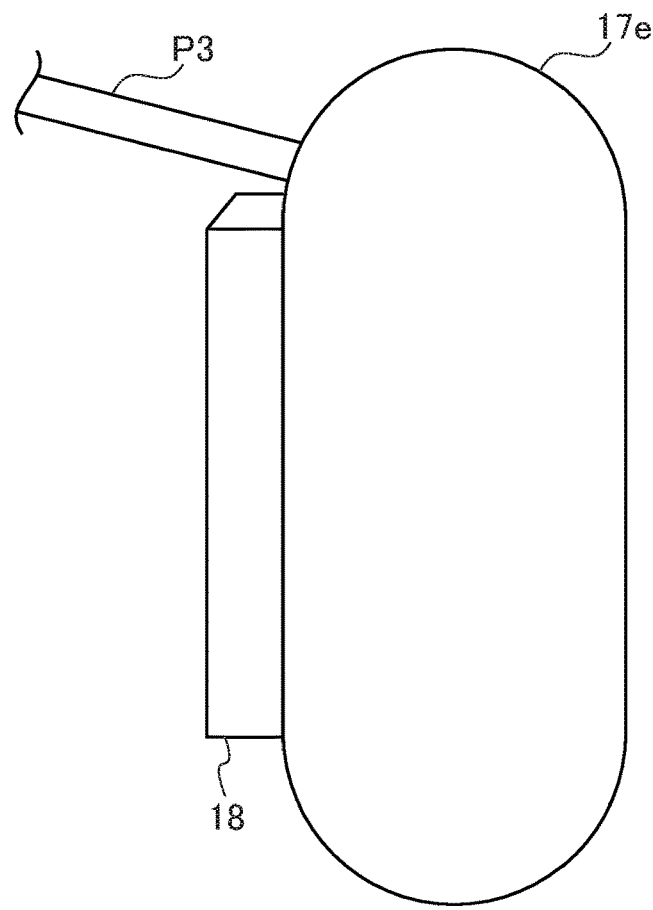
FIG. 13A is a schematic perspective view of a gas-liquid separation tank according to the fourth modification of the second embodiment.
Figure 13B:
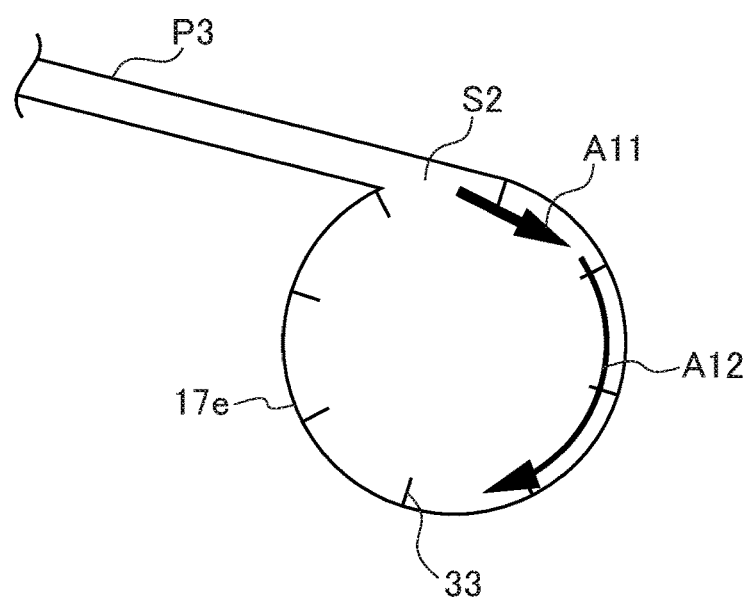
FIG. 13B is a plan view of FIG. 13A.

Next, the fourth modification of the second embodiment will be described. FIG. 13A is a schematic perspective view of a gas-liquid separation tank according to the fourth modification of the second embodiment. As shown in FIG. 13A, the pipe P3 is connected to the upper part of the gas-liquid separation tank 17e with an inclination to the vertically downward direction. FIG. 13B is a plan view of FIG. 13A. As shown in FIG. 13B, the cross section of the gas-liquid separation tank 17e is substantially circular, the pipe P3 is connected to the gas-liquid separation tank such that the pipe P3 is located in a tangential direction of a circle that is an outer edge of the gas-liquid separation tank in plan view so that the gas-liquid mixture flowing into the gas-liquid separation tank 17e moves along the inner wall of the gas-liquid separation tank 17e. As a result, the gas-liquid mixture flowing in from the pipe P3 through a supply port S2 moves along the inner wall of the gas-liquid separation tank 17e as indicated by arrows A11 and A12. As a result, the gas-liquid mixture collides with the protrusion 33 provided on the inner wall of the gas-liquid separation tank 17e, a stirring effect is generated at the time of this collision, and the dissolution of the gas is promoted.

Figure 14:
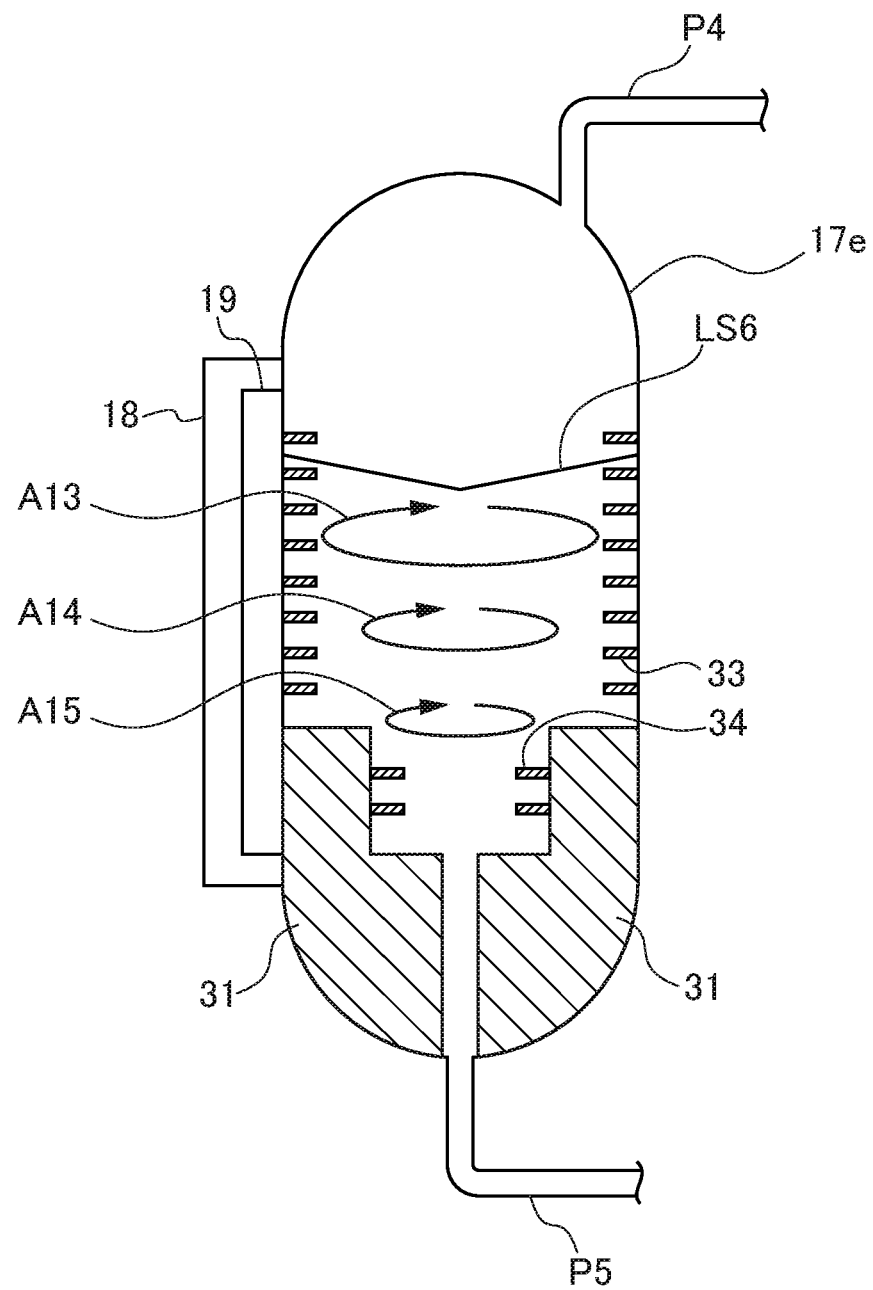
FIG. 14 is a schematic longitudinal sectional view of a gas-liquid separation tank according to the fourth modification of the second embodiment.

FIG. 14 is a schematic longitudinal sectional view of a gas-liquid separation tank according to the fourth modification of the second embodiment. As shown by arrows A13 to A15 in FIG. 14, the liquid stored in the gas-liquid separation tank 17e internally has a flow along the circumference. As a result, due to this flow, the liquid stored in the gas-liquid separation tank 17e collides with the protrusion 33 provided on the inner wall of the gas-liquid separation tank 17e, so that a stirring effect is generated at the time of this collision, and the dissolution of the gas is promoted.

In addition, although the supply port S2 is described as one here, a plurality of supply ports may be provided as long as the gas-liquid mixture can flow in the same rotation direction (here, clockwise as an example). When there is a plurality of supply ports, they may be located not only on the same circumference but also at different heights in the vertical direction. Further, the supply angle may be horizontal, or may have a depression angle or an elevation angle.

Fifth Modification of Second Embodiment

Figure 15:
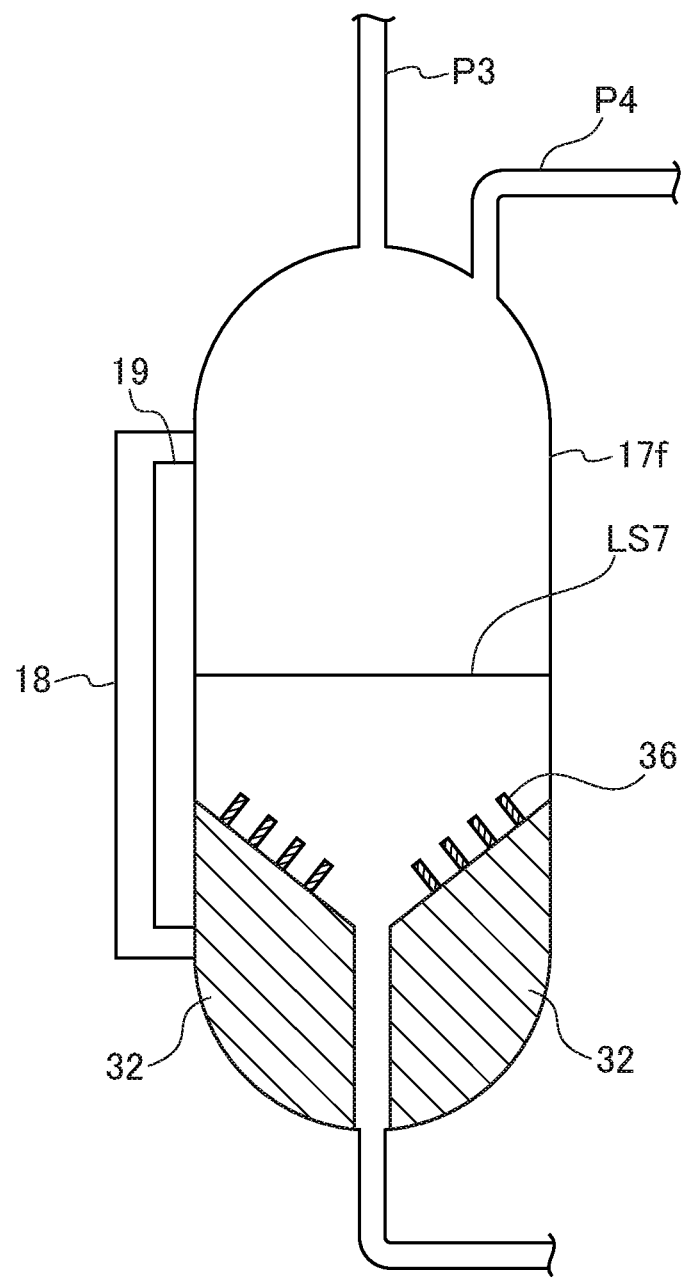
FIG. 15 is a schematic longitudinal sectional view of a gas-liquid separation tank according to the fifth modification of the second embodiment.

FIG. 15 is a schematic longitudinal sectional view of a gas-liquid separation tank according to the fifth modification of the second embodiment. As shown in FIG. 15, a gas-liquid separation tank 17f according to the fifth modification of the second embodiment is different from the gas-liquid separation tank 17c according to the first modification of the second embodiment in FIG. 9 in that a protrusion 36 is provided on the inclined surface of the flow path adjustment member 32.

Sixth Modification of Second Embodiment

Figure 16:
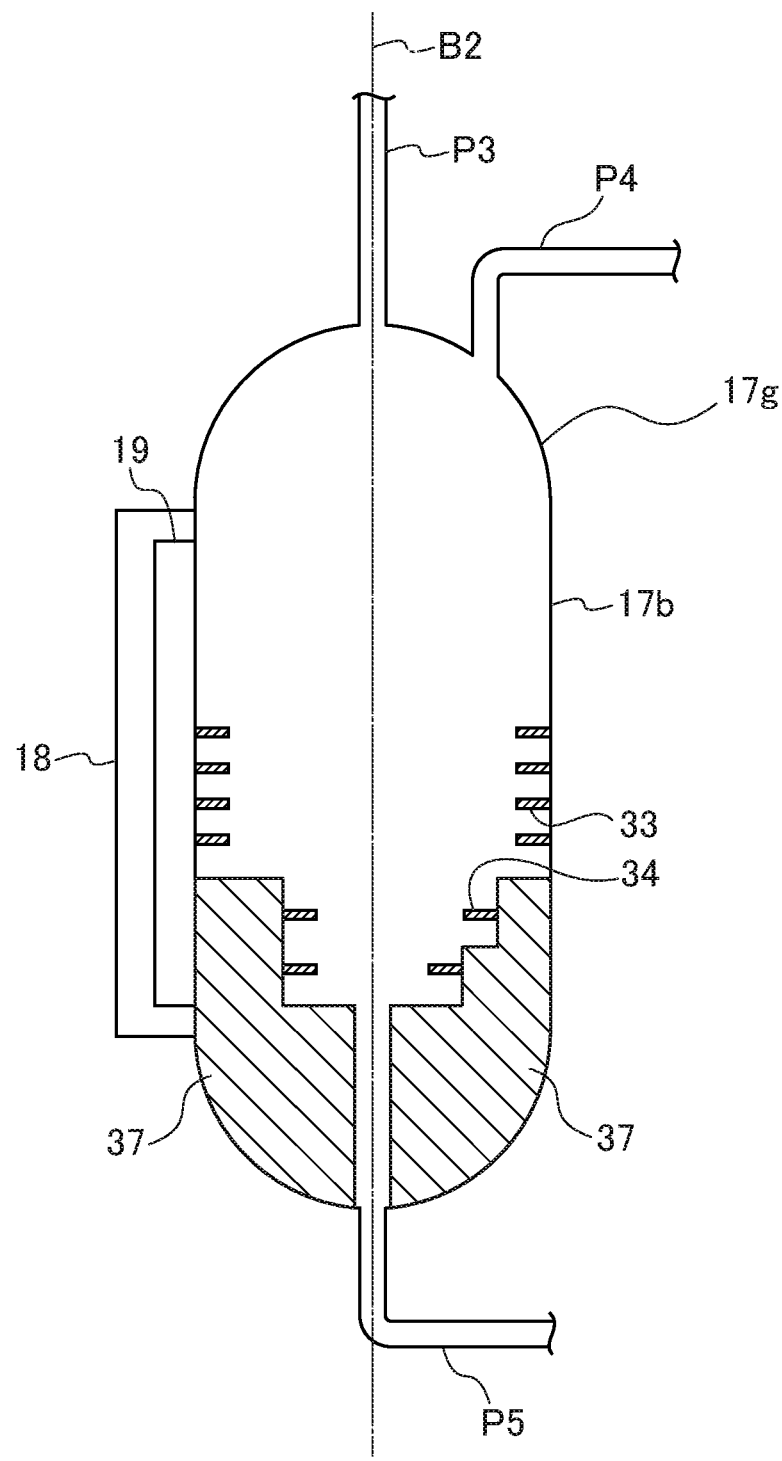
FIG. 16 is a schematic longitudinal sectional view of a gas-liquid separation tank according to the sixth modification of the second embodiment.

FIG. 16 is a schematic longitudinal sectional view of a gas-liquid separation tank according to the sixth modification of the second embodiment. As shown in FIG. 16, as shown in a gas-liquid separation tank 17g according to the sixth modification of the second embodiment, the flow path inside a flow path adjustment member 37 may be asymmetric with respect to the longitudinal axis B2.

Third Embodiment

Figure 17A:
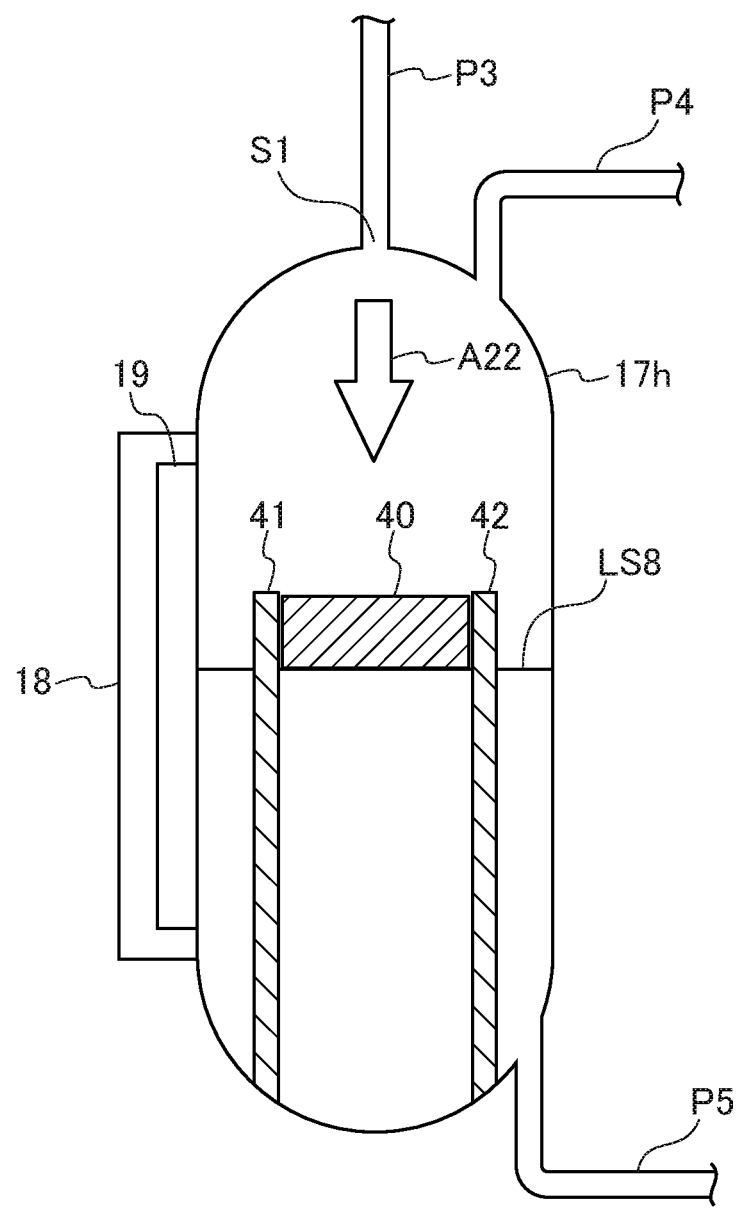
FIG. 17A is a schematic longitudinal sectional view of a gas-liquid separation tank according to the third embodiment when the liquid level is high.
Figure 17B:
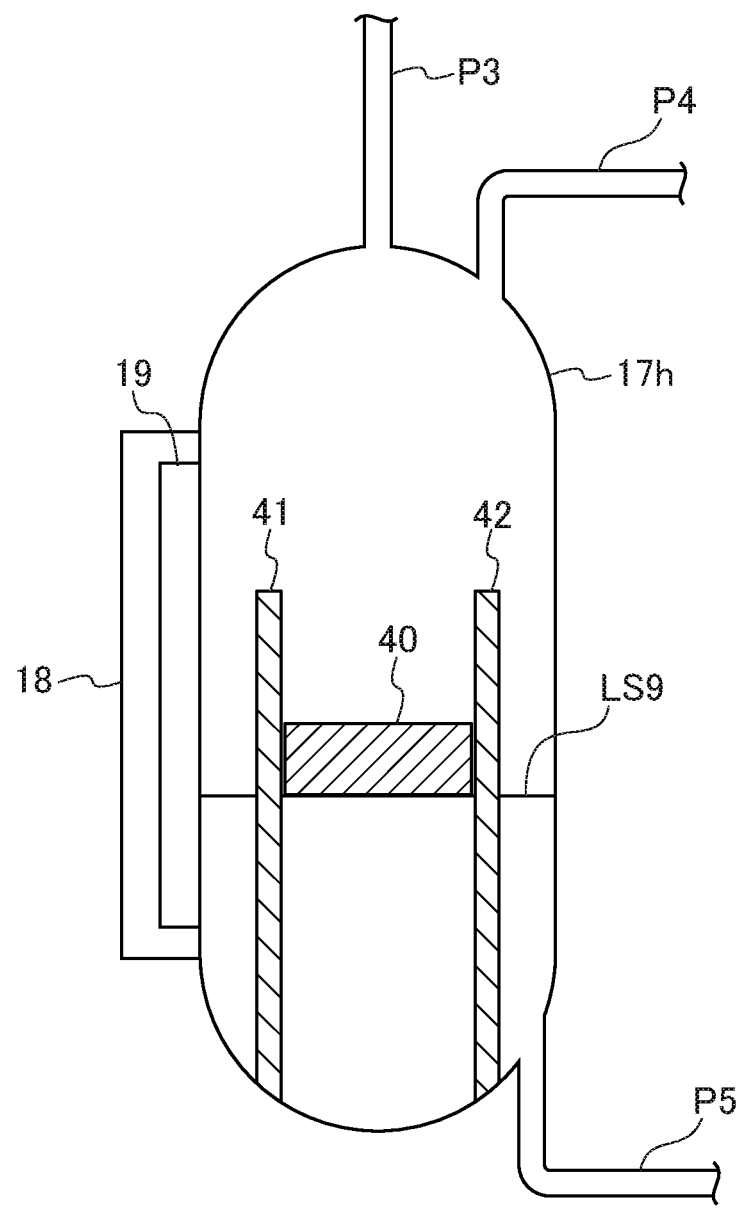
FIG. 17B is a schematic longitudinal sectional view of a gas-liquid separation tank according to the third embodiment when the liquid level is low.

Next, the third embodiment will be described. FIG. 17A is a schematic longitudinal sectional view of a gas-liquid separation tank according to the third embodiment when the liquid level is high. FIG. 17B is a schematic longitudinal sectional view of a gas-liquid separation tank according to the third embodiment when the liquid level is low. The same elements as those in FIG. 2 are denoted by the same reference numerals, and description thereof will be omitted.

As shown in FIG. 17A, a plate 40 is provided at the liquid level of a gas-liquid separation tank 17h. The plate 40 is disposed so that the gas-liquid mixture flowing into the gas-liquid separation tank 17h through the pipe P3 directly hits the plate 40. As a result, air bubbles can be fined by the gas-liquid mixture directly hitting the plate 40, so that the gas-liquid contact area can be improved, and the dissolution of the gas is promoted.

Here, as an example, as the plate 40 is floating on the liquid level and is positioned by support members 41 to 44 (see also FIG. 18) so that the horizontal position is located below an opening S1 communicating with the pipe P3. Thus, as shown in FIGS. 17A and 17B, the plate 40 moves up and down as the heights of the liquid levels LS8 and LS9 go up and down.

Figure 18:
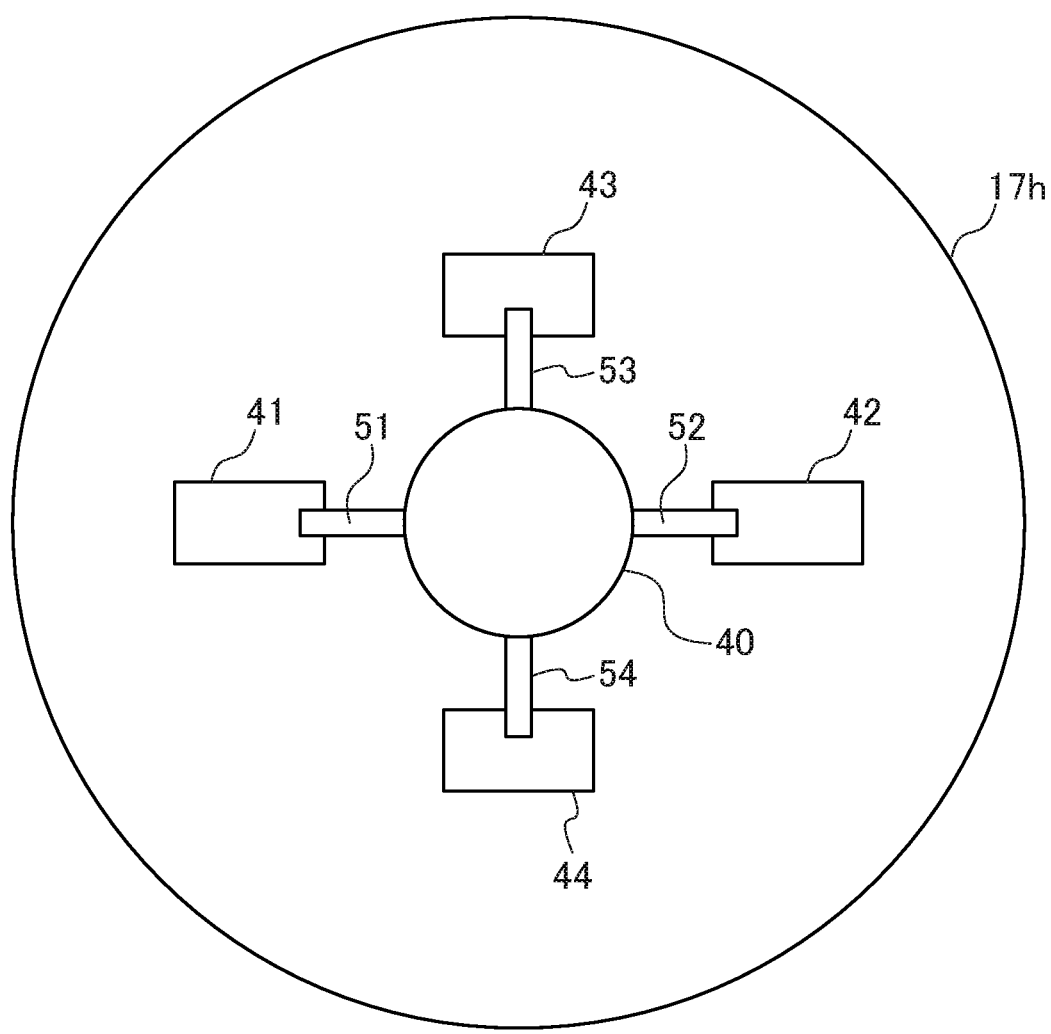
FIG. 18 is an arrow view in the direction of arrow A22 in FIG. 17A.

FIG. 18 is an arrow view in the direction of arrow A22 in FIG. 17A. As shown in FIG. 18, the support members 41 to 44 are connected to the plate 40 via corresponding connection members 51 to 54. The connection members 51 to 54 may be an elastic body or a string. The plate 40 has a columnar shape, and the distance between the support members 41 to 44 is shorter than the diameter of the plate 40. Thus, the plate 40 can be kept in a region surrounded by the support members 41 to 44.

The plate 40 may be fixed above the liquid level of the gas-liquid separation tank 17h, or may be fixed at the liquid level.

First Modification of Third Embodiment

Figure 19A:
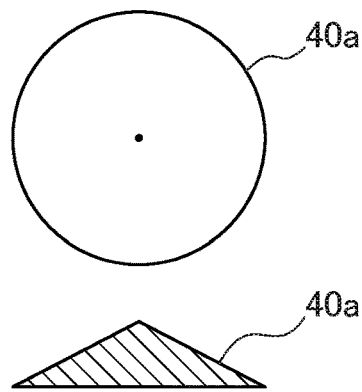
FIG. 19A is a top view and a longitudinal sectional view of a plate according to the first modification of the third embodiment.

FIG. 19A is a top view and a longitudinal sectional view of a plate according to the first modification of the third embodiment. As shown in FIG. 19A, a plate 40a according to the first modification of the third embodiment may be a polygonal pyramid having a substantially circular shape in a top view and a triangular shape in a longitudinal sectional view.

Second Modification of Third Embodiment

Figure 19B:
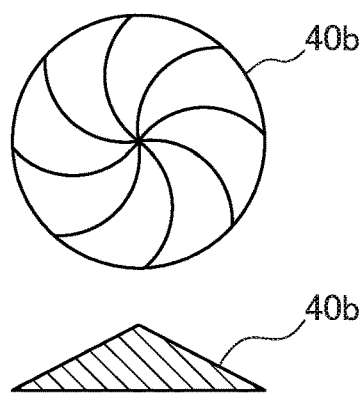
FIG. 19B is a top view and a longitudinal sectional view of a plate according to the second modification of the third embodiment.

FIG. 19B is a top view and a longitudinal sectional view of a plate according to the second modification of the third embodiment. As shown in FIG. 19B, a plate 40b according to the second modification of the third embodiment may be a polygonal pyramid having a substantially circular shape in a top view and a triangular shape in a longitudinal sectional view. As shown in the top view, a curved groove may be provided from the apex of the polygonal pyramid to the bottom side. Thus, the gas-liquid mixture may be intentionally brought into contact with the apex of the polygonal pyramid, and the plate 40b may be rotated on a horizontal plane by the force. As a result, since the liquid stored in the gas-liquid separation tank 17h is stirred by rotating the plate 40b on the horizontal plane, gas-liquid contact time is improved, so that the gas dissolution can be improved.

Third Modification of Third Embodiment

Figure 19C:
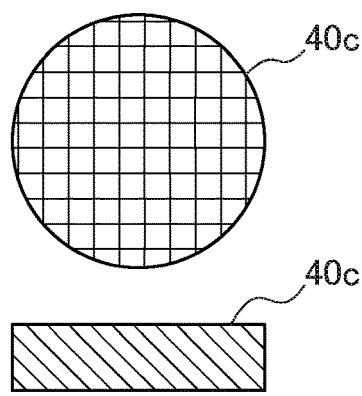
FIG. 19C is a top view and a longitudinal sectional view of a plate according to the third modification of the third embodiment.

FIG. 19C is a top view and a longitudinal sectional view of a plate according to the third modification of the third embodiment. As shown in FIG. 19C, a plate 40c according to the third modification of the third embodiment may be a column having a substantially circular shape in a top view and a rectangular shape in a longitudinal sectional view. The plate 40c may be provided with a plurality of, for example, square through holes in the plate thickness direction. The shape of the through hole may be round. The plate 40c may be a polygonal pillar.

As described above, the present invention is not limited to the above embodiment as it is, and the constituent elements can be modified and materialized without departing from the gist thereof in the implementation stage. In addition, various inventions can be formed by appropriately combining a plurality of constituent elements disclosed in the above embodiment. For example, some constituent elements may be deleted from all the constituent elements shown in the embodiment. Further, the constituent elements of different embodiments may be appropriately combined.

REFERENCE SIGNS LIST 1, 1b, 1c, 1d, 100 Gas dissolved liquid manufacturing device
10 driving device
11, 111 pump
112 valve
113 nozzle
115 valve
117 gas-liquid separation tank
118 liquid level monitoring sensor mounting tube
119 liquid level monitoring sensor
12 valve
13 nozzle
14 valve
15 nozzle
16 nozzle
17, 17b, 17c, 17d, 17e, 17f, 17g, 17h gas-liquid separation tank
18 liquid level monitoring sensor mounting tube
19 liquid level monitoring sensor
21 pressure sensor
22 pressure regulating valve
23 flow rate sensor
24 control unit
25 mass flow controller
26 mass flow controller
31, 32, 37 flow path adjustment member
311 step
33, 34, 36 protrusion
35 shower nozzle
40 plate

What is claimed is:

1. A gas dissolved liquid manufacturing device comprising:
   a pump configured to pressurize a liquid;
   a pipe comprising a first end communicating with a discharge outlet of the pump;
   a nozzle disposed on the pipe, the nozzle being configured to generate micro bubbles within the liquid in the pipe using a supplied gas to form a gas-liquid mixture; and
   a gas-liquid separation tank whose upper part communicates with a second end of the pipe, the upper part of the gas-liquid separation tank being configured to receive the gas-liquid mixture from the second end of the pipe, the gas-liquid separation tank being configured to separate a gas-liquid mixture generated by the nozzle into a gas and a liquid.

2. The gas dissolved liquid manufacturing device according to claim 1, wherein
   $0 < d/D \leq 0.5$ and $0 < f/F \leq 5$, where D is an internal diameter of the gas-liquid separation tank, d is an internal diameter of the pipe, F is a flow rate of a liquid of the gas-liquid mixture supplied to the upper part of the gas-liquid separation tank by the pipe, and f is a flow rate of a gas contained in the same gas-liquid mixture.

3. The gas dissolved liquid manufacturing device according to claim 1, wherein
   the gas-liquid separation tank has a sectional area of a space through which a liquid is capable of passing, the sectional area decreasing as going downward, and
   the gas dissolved liquid manufacturing device comprises:
   a flow rate sensor configured to detect a flow rate of a liquid supplied to the gas-liquid separation tank; and
   a control unit configured to control the pump so that the lower the flow rate measured by the flow rate sensor, the lower a liquid level is kept, and so that the higher the flow rate measured by the flow rate sensor, the higher a liquid level is kept.

4. The gas dissolved liquid manufacturing device according to claim 3, wherein
   a flow path adjustment member configured to form a discharge port through which a gas-liquid mixture is discharged and a flow path to the discharge port is provided inside the gas-liquid separation tank, and a sectional area of the flow path is smaller than a sectional area of the gas-liquid separation tank, or the sectional area of the flow path decreases as going downward, and
   the control unit controls the pump so as to keep a liquid level at a position above the flow path adjustment member when a flow rate measured by the flow rate sensor exceeds a threshold, and controls the pump so as to keep a liquid level in the flow path formed by the flow path adjustment member when the flow rate measured by the flow rate sensor is equal to or less than the threshold.

5. The gas dissolved liquid manufacturing device according to claim 4, wherein
a step is provided on an inner wall of the flow path adjustment member.

6. The gas dissolved liquid manufacturing device according to claim 4, wherein
a protrusion or a hubbly structure is provided on an inner wall of the flow path adjustment member.

7. The gas dissolved liquid manufacturing device according to claim 1, wherein
a protrusion or a hubbly structure is provided on an inner wall of the gas-liquid separation tank.

8. The gas dissolved liquid manufacturing device according to claim 7, wherein
a cross section of the gas-liquid separation tank is substantially circular, and wherein
the pipe is connected to the gas-liquid separation tank such that the pipe is located in a tangential direction of a circle that is an outer edge of the gas-liquid separation tank in plan view so that the gas-liquid mixture flowing into the gas-liquid separation tank moves along the inner wall of the gas-liquid separation tank.

9. The gas dissolved liquid manufacturing device according to claim 1, wherein
a supply port communicating with the pipe is provided at an upper part of the gas-liquid separation tank,
a shower nozzle communicating with the supply port is provided inside the gas-liquid separation tank, and
the shower nozzle sprays a supplied gas-liquid mixture and discharges the sprayed gas-liquid mixture into the gas-liquid separation tank.

10. The gas dissolved liquid manufacturing device according to claim 1, wherein
a plate is provided at or above a liquid level of the gas-liquid separation tank, and
the plate is disposed so that a gas-liquid mixture flowing into the gas-liquid separation tank through the pipe directly hits the plate.

11. The gas dissolved liquid manufacturing device according to claim 1, wherein
the nozzle is provided at a portion of the pipe, the portion being connected substantially vertically to the gas-liquid separation tank.

* * * * *